US011546360B2

(12) United States Patent
Woodford et al.

(10) Patent No.: US 11,546,360 B2
(45) Date of Patent: *Jan. 3, 2023

(54) CYBER SECURITY APPLIANCE FOR A CLOUD INFRASTRUCTURE

(71) Applicant: Darktrace Holdings Limited, Cambridge (GB)

(72) Inventors: Andrew Woodford, Cheltenham (GB); Jacob Araiza, Monmouth (GB); Alex Markham, Cambridgeshire (GB); Matthew Dunn, Cambridgeshire (GB)

(73) Assignee: Darktrace Holdings Limited, Cambridge (GB)

( * ) Notice: Subject to any disclaimer, the term of this patent is extended or adjusted under 35 U.S.C. 154(b) by 840 days.

This patent is subject to a terminal disclaimer.

(21) Appl. No.: 16/278,982

(22) Filed: Feb. 19, 2019

(65) Prior Publication Data

US 2019/0260794 A1 Aug. 22, 2019

Related U.S. Application Data

(60) Provisional application No. 62/632,623, filed on Feb. 20, 2018.

(51) Int. Cl.
*H04L 9/40* (2022.01)
*G06N 20/10* (2019.01)
(Continued)

(52) U.S. Cl.
CPC ........ *H04L 63/1425* (2013.01); *G06F 3/0486* (2013.01); *G06F 3/04842* (2013.01);
(Continued)

(58) Field of Classification Search
USPC .......................................................... 726/25
See application file for complete search history.

(56) References Cited

U.S. PATENT DOCUMENTS 6,154,844 A   11/2000   Touboul et al.
6,965,968 B1  11/2005   Touboul
(Continued)

FOREIGN PATENT DOCUMENTS

EP   2922268 A1      9/2015
EP   3262815 B1 *  10/2020   ........... H04L 63/145
(Continued)

OTHER PUBLICATIONS

Abdallah Abbey Sebyala et al., "Active Platform Security through Intrusion Detection Using Naive Bayesian Network for Anomaly Detection," Department of Electronic and Electrical Engineering, 5 pages, University College London, Torrington Place, England, United Kingdom.

(Continued)

*Primary Examiner* — Sakinah White Taylor
(74) *Attorney, Agent, or Firm* — Rutan & Tucker, LLP

(57) ABSTRACT

A cyber security appliance has modules that utilize probes to interact with entities in a cloud infrastructure environment (CIE). A cloud module can 1) use the information about relevant changes in the CIE fed from the probes, and 2) use machine learning models that are trained on a normal behavior of at least a first entity associated with the CIE; and thus, indicate when a behavior of the first entity falls outside of being a normal pattern of life. A cyber threat module can use machine learning models trained on cyber threats in the CIE and examine at least the behaviors of the first entity falling outside of the normal pattern of life to determine what is a likelihood of 'a chain of unusual behaviors under analysis that fall outside of being the normal behavior' is a cyber threat. An autonomous response module can cause actions to contain the cyber threat.

18 Claims, 5 Drawing Sheets

(51) Int. Cl.
| | | |
|---|---|---|
| *G06N 20/00* | (2019.01) | |
| *G06F 21/36* | (2013.01) | |
| *H04L 43/045* | (2022.01) | |
| *G06F 16/2455* | (2019.01) | |
| *G06F 3/04842* | (2022.01) | |
| *G06F 3/0486* | (2013.01) | |
| *H04L 41/22* | (2022.01) | |
| *G06K 9/62* | (2022.01) | |
| *G06F 40/40* | (2020.01) | |
| *G06V 30/10* | (2022.01) | |
| *H04L 51/42* | (2022.01) | |
| *H04L 51/212* | (2022.01) | |
| *H04L 51/224* | (2022.01) | |
| *G06F 21/55* | (2013.01) | |
| *G06N 20/20* | (2019.01) | |

(52) U.S. Cl.
CPC .......... *G06F 16/2455* (2019.01); *G06F 21/36* (2013.01); *G06F 21/554* (2013.01); *G06F 21/556* (2013.01); *G06F 40/40* (2020.01); *G06K 9/622* (2013.01); *G06K 9/6218* (2013.01); *G06N 20/00* (2019.01); *G06N 20/10* (2019.01); *G06V 30/10* (2022.01); *H04L 41/22* (2013.01); *H04L 43/045* (2013.01); *H04L 51/212* (2022.05); *H04L 51/224* (2022.05); *H04L 51/42* (2022.05); *H04L 63/0209* (2013.01); *H04L 63/0428* (2013.01); *H04L 63/101* (2013.01); *H04L 63/14* (2013.01); *H04L 63/1416* (2013.01); *H04L 63/1433* (2013.01); *H04L 63/1441* (2013.01); *H04L 63/1483* (2013.01); *H04L 63/20* (2013.01); *G06N 20/20* (2019.01)

(56) References Cited

U.S. PATENT DOCUMENTS

| | | |
|---|---|---|
| 7,307,999 B1 | 12/2007 | Donaghey |
| 7,418,731 B2 | 8/2008 | Touboul |
| 7,448,084 B1 | 11/2008 | Apap et al. |
| 8,312,540 B1 | 11/2012 | Kahn et al. |
| 8,819,803 B1 | 8/2014 | Richards et al. |
| 8,879,803 B2 | 11/2014 | Ukil et al. |
| 8,966,036 B1 | 2/2015 | Asgekar et al. |
| 9,043,905 B1 | 5/2015 | Allen et al. |
| 9,106,687 B1 | 8/2015 | Sawhney et al. |
| 9,185,095 B1 | 11/2015 | Moritz et al. |
| 9,213,990 B2 | 12/2015 | Adjaoute |
| 9,401,925 B1 | 7/2016 | Guo et al. |
| 9,516,039 B1 | 12/2016 | Yen et al. |
| 9,516,053 B1 | 12/2016 | Muddu et al. |
| 9,641,544 B1 | 5/2017 | Treat et al. |
| 9,712,548 B2 | 7/2017 | Shmueli et al. |
| 9,727,723 B1 | 8/2017 | Kondaveeti et al. |
| 10,498,605 B2 * | 12/2019 | Weith .................... G06F 16/25 |
| 2002/0186698 A1 | 12/2002 | Ceniza |
| 2003/0070003 A1 | 4/2003 | Chong et al. |
| 2004/0083129 A1 | 4/2004 | Herz |
| 2004/0167893 A1 | 8/2004 | Matsunaga et al. |
| 2005/0065754 A1 | 3/2005 | Schaf et al. |
| 2007/0118909 A1 | 5/2007 | Hertzog et al. |
| 2007/0294187 A1 | 12/2007 | Scherrer |
| 2008/0005137 A1 | 1/2008 | Surendran et al. |
| 2008/0109730 A1 | 5/2008 | Coffman et al. |
| 2009/0106174 A1 | 4/2009 | Battisha et al. |
| 2009/0254971 A1 | 10/2009 | Herz et al. |
| 2010/0009357 A1 | 1/2010 | Nevins et al. |
| 2010/0095374 A1 | 4/2010 | Gillum et al. |
| 2010/0125908 A1 | 5/2010 | Kudo |
| 2010/0235908 A1 | 9/2010 | Eynon et al. |
| 2010/0299292 A1 | 11/2010 | Collazo |
| 2011/0093428 A1 | 4/2011 | Wisse |
| 2011/0213742 A1 | 9/2011 | Lemmond et al. |
| 2011/0261710 A1 | 10/2011 | Chen et al. |
| 2012/0096549 A1 | 4/2012 | Amini et al. |
| 2012/0137367 A1 | 5/2012 | Dupont et al. |
| 2012/0209575 A1 | 8/2012 | Barbat et al. |
| 2012/0210388 A1 | 8/2012 | Kolishchak |
| 2012/0284791 A1 | 11/2012 | Miller et al. |
| 2012/0304288 A1 | 11/2012 | Wright et al. |
| 2013/0091539 A1 | 4/2013 | Khurana et al. |
| 2013/0198119 A1 | 8/2013 | Eberhardt, III et al. |
| 2013/0198840 A1 | 8/2013 | Drissi et al. |
| 2013/0254885 A1 | 9/2013 | Devost |
| 2014/0007237 A1 | 1/2014 | Wright et al. |
| 2014/0074762 A1 | 3/2014 | Campbell |
| 2014/0165207 A1 | 6/2014 | Engel et al. |
| 2014/0215618 A1 | 7/2014 | Amit |
| 2014/0325643 A1 | 10/2014 | Bart et al. |
| 2015/0067835 A1 | 3/2015 | Chari et al. |
| 2015/0081431 A1 | 3/2015 | Akahoshi et al. |
| 2015/0161394 A1 | 6/2015 | Ferragut et al. |
| 2015/0163121 A1 | 6/2015 | Mahaffey et al. |
| 2015/0172300 A1 | 6/2015 | Cochenour |
| 2015/0180893 A1 | 6/2015 | Im et al. |
| 2015/0213358 A1 | 7/2015 | Shelton et al. |
| 2015/0286819 A1 | 10/2015 | Coden et al. |
| 2015/0310195 A1 | 10/2015 | Bailor et al. |
| 2015/0319185 A1 | 11/2015 | Kirti et al. |
| 2015/0341379 A1 | 11/2015 | Lefebvre et al. |
| 2015/0363699 A1 | 12/2015 | Nikovski |
| 2015/0379110 A1 | 12/2015 | Marvasti et al. |
| 2016/0062950 A1 | 3/2016 | Brodersen et al. |
| 2016/0078365 A1 | 3/2016 | Baumard |
| 2016/0149941 A1 | 5/2016 | Thakur et al. |
| 2016/0164902 A1 | 6/2016 | Moore |
| 2016/0173509 A1 | 6/2016 | Ray et al. |
| 2016/0241576 A1 | 8/2016 | Rathod et al. |
| 2016/0352768 A1 | 12/2016 | Lefebvre et al. |
| 2016/0373476 A1 | 12/2016 | Dell'Anno et al. |
| 2017/0063907 A1 | 3/2017 | Muddu et al. |
| 2017/0063910 A1 | 3/2017 | Muddu et al. |
| 2017/0063911 A1 | 3/2017 | Muddu et al. |
| 2017/0169360 A1 | 6/2017 | Veeramachaneni et al. |
| 2017/0220801 A1 | 8/2017 | Stockdale et al. |
| 2017/0230391 A1 | 8/2017 | Ferguson et al. |
| 2017/0230392 A1 | 8/2017 | Stockdale |
| 2017/0251012 A1 | 8/2017 | Stockdale et al. |
| 2017/0270422 A1 | 9/2017 | Sorakado |
| 2018/0027006 A1 | 1/2018 | Zimmermann et al. |
| 2018/0167402 A1 | 6/2018 | Scheidler et al. |
| 2018/0248905 A1 * | 8/2018 | Cote .................. G06F 17/18 |

FOREIGN PATENT DOCUMENTS

| | | |
|---|---|---|
| WO | 2001031420 A2 | 5/2001 |
| WO | 2008121945 A2 | 10/2008 |
| WO | 2013053407 A1 | 4/2013 |
| WO | 2014088912 A1 | 6/2014 |
| WO | 2015027828 A1 | 3/2015 |
| WO | 2016020660 A1 | 2/2016 |

OTHER PUBLICATIONS

Marek Zachara et al., "Detecting Unusual User Behavior to Identify Hijacked Internet Auctions Accounts," Lecture Notes in Computer Science, 2012, vol. 7465, Springer, Berlin, Heidelberg, Germany.

* cited by examiner

CYBER SECURITY APPLIANCE FOR A CLOUD INFRASTRUCTURE

RELATED APPLICATION

This application claims priority to and the benefit of under 35 USC 119 of U.S. provisional patent application titled "A cyber threat defense system with various improvements," filed Feb. 20, 2018, Ser. No. 62/632,623, which is incorporated herein by reference in its entirety.

NOTICE OF COPYRIGHT

A portion of this disclosure contains material that is subject to copyright protection. The copyright owner has no objection to the facsimile reproduction by anyone of the material subject to copyright protection as it appears in the United States Patent & Trademark Office's patent file or records, but otherwise reserves all copyright rights whatsoever.

FIELD

Embodiments of the design provided herein generally relate to a cyber threat defense system.

BACKGROUND

The reality is that modern threats bypass the traditional legacy defense tools on a daily basis. These tools need a new tool based on a new approach that can complement them and mitigate their deficiencies. In the complex modern world it is advantageous that the approach is fully automated as it is virtually impossible for humans to sift through the vast amount of security information gathered each minute within a digital business.

SUMMARY

In an embodiment, a cyber security appliance can have one or more modules that utilize probes to interact with entities in a cloud infrastructure environment that may include one or more cloud infrastructure entities reliant on packet transmission (including but not limited to Containers, Virtual Machines etc.), whether by API interaction, accessing logging tools, and/or making relevant requests, and that use the probes to feed information about relevant changes in the cloud infrastructure environment back to the modules in a central location of the cyber-security appliance. A cloud module can be configured to 1) use the information about relevant changes in the cloud infrastructure environment fed from the probes, and 2) use one or more machine learning models that are trained on a normal behavior of at least a first entity associated with the cloud infrastructure environment; and thus, are able to indicate when a behavior of the first entity falls outside of being a normal pattern of life. A cyber threat module can be configured to use one or more machine learning models trained on cyber threats in the cloud infrastructure environment and examine at least the behaviors of the first entity falling outside of the normal pattern of life to determine what is a likelihood of 'a chain of unusual behaviors under analysis that fall outside of being the normal behavior' is a cyber threat. An autonomous response module, rather than a human taking an action, can be configured to cause one or more actions to be taken to contain the cyber threat, identified by the cyber threat module, within an organization's portion of the cloud infrastructure environment when a cyber-threat risk parameter is indicative of a likelihood of a cyber-threat is equal to or above an actionable threshold.

These and other features of the design provided herein can be better understood with reference to the drawings, description, and claims, all of which form the disclosure of this patent application.

DRAWINGS

The drawings refer to some embodiments of the design provided herein in which:

FIG. 1 illustrates a block diagram of an embodiment of an appliance extension with a number of different modules to perform various functions.

FIG. 2 illustrates a diagram of an embodiment of modules in the cyber security appliance communicating with a set of probes to examine at least the behaviors of i) administrative changes in the cloud infrastructure environment, ii) traffic that flows between the two or more cloud infrastructure elements reliant on packet transmission a virtual environment, and iii) virtual traffic that leaves the virtual environment in the cloud infrastructure environment and then travels over a physical network.

Figure 1:
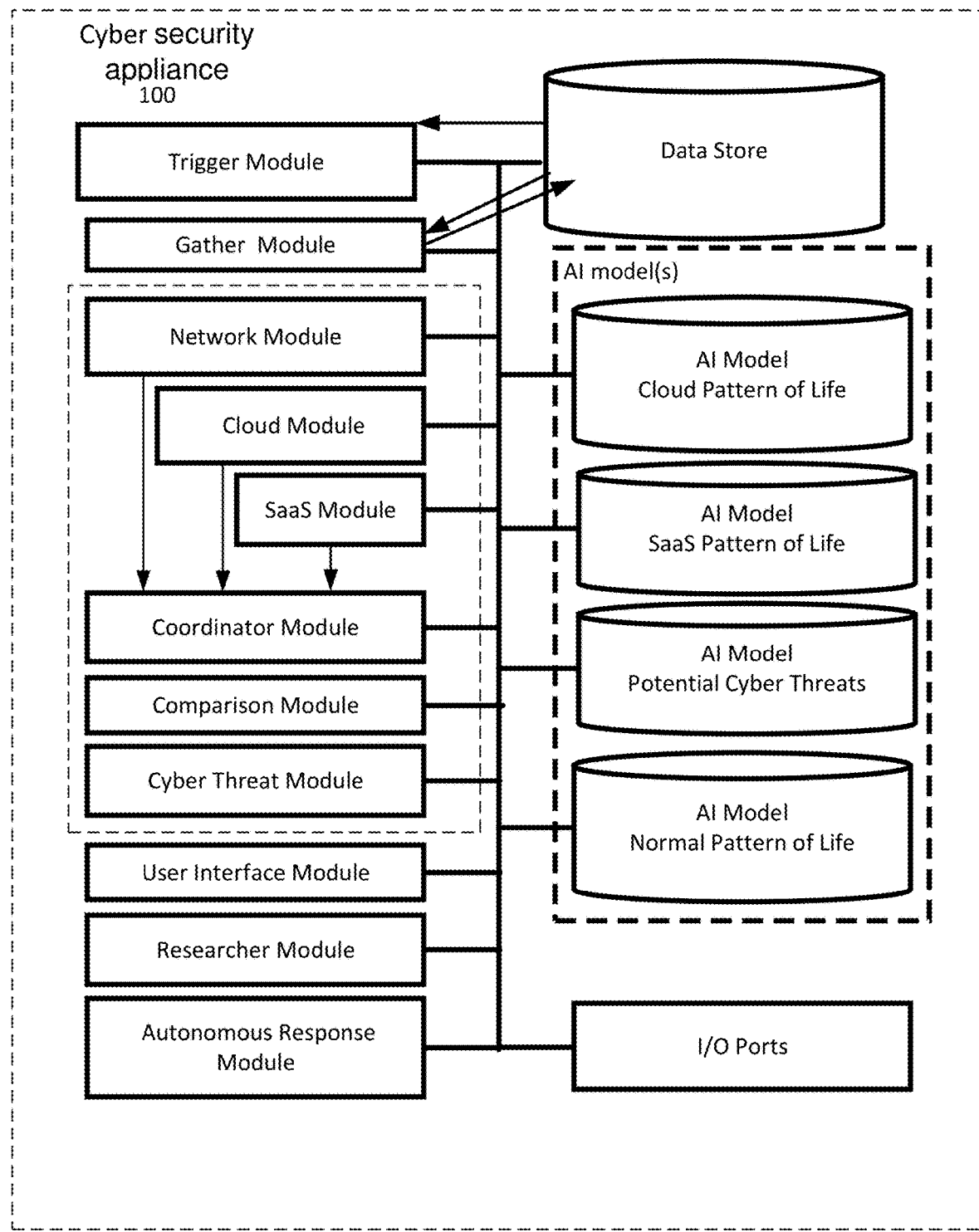

While the design is subject to various modifications, equivalents, and alternative forms, specific embodiments thereof have been shown by way of example in the drawings and will now be described in detail. It should be understood that the design is not limited to the particular embodiments disclosed, but—on the contrary—the intention is to cover all modifications, equivalents, and alternative forms using the specific embodiments.

DESCRIPTION

In the following description, numerous specific details are set forth, such as examples of specific data signals, named components, number of servers in a system, etc., in order to provide a thorough understanding of the present design. It will be apparent, however, to one of ordinary skill in the art that the present design can be practiced without these specific details. In other instances, well known components or methods have not been described in detail but rather in a block diagram in order to avoid unnecessarily obscuring the present design. Further, specific numeric references such as a first server, can be made. However, the specific numeric reference should not be interpreted as a literal sequential order but rather interpreted that the first server is different than a second server. Thus, the specific details set forth are merely exemplary. Also, the features implemented in one embodiment may be implemented in another embodiment where logically possible. The specific details can be varied from and still be contemplated to be within the spirit and scope of the present design. The term coupled is defined as meaning connected either directly to the component or indirectly to the component through another component.

In general, the cyber security appliance may use artificial intelligence to analyze cyber security threats. The cyber security appliance has modules that utilize probes to interact with entities in a cloud infrastructure environment. A cloud module can 1) use the information about relevant changes in the cloud infrastructure environment fed from the probes, and 2) use machine learning models that are trained on a normal behavior of at least a first entity associated with the cloud infrastructure environment; and thus, indicate when a behavior of the first entity falls outside of being a normal pattern of life. A cyber threat module can use machine learning models trained on cyber threats in the cloud infrastructure environment and examine at least the behaviors of the first entity falling outside of the normal pattern of life to determine what is a likelihood of 'a chain of unusual behaviors under analysis that fall outside of being the normal behavior' is a cyber threat? An autonomous response module can cause actions to contain/counter the cyber threat.

FIG. 1 illustrates a block diagram of an embodiment of a cyber security appliance with various modules that reference machine learning models that are trained on the normal behavior of cloud activity and its user activity associated with the cloud infrastructure environment.

The cyber security appliance 100 may protect against cyber security threats from the cloud infrastructure environment. The cyber security appliance 100 may include components such as i) a trigger module, ii) a gather module, iii) a data store, iv) a user interface module, v) a cloud module, vi) a Software-As-A-Service (SaaS) module, vii) a coordinator module, vii) a comparison module, ix) a cyber threat module, x) a researcher module, xi) an autonomous response module, xii) at least one input or output (I/O) port to securely connect to other network ports as required, xiii) one or more machine learning models such as a first Artificial Intelligence model trained on cloud events, administration, and related data, a second Artificial Intelligence model trained on SaaS events for a specific SaaS application, a third Artificial Intelligence model trained on potential cyber threats, and additional Artificial Intelligence models, each trained on different users, devices, system activities and interactions between entities in the system, and other aspects of the system, as well as xiv) other similar components in the cyber security appliance 100.

The one or more modules utilize probes to interact with entities in, for example, a cloud infrastructure environment that may include one or more cloud infrastructure entities reliant on packet transmission (including but not limited to Containers, Virtual Machines etc.). The modules utilize the probes to interact, whether by API interaction, accessing user/audit/event logging tools, ingesting network traffic, and/or making relevant requests. The probes then feed information about relevant changes in, for example, the cloud infrastructure environment back to the modules and data store in a central location of the cyber-security appliance.

The various modules can maintain the privacy of the user data or the third-party event data. The modules can be configured through the probes to harvest both metadata and other data detailing the administrative event, network data, etc., leaving the actual contents of the file or resource undisturbed. The various modules then can be configured to further anonymize the collected raw data and metadata to remove any personally identifiable information for the third-party operator and/or user from the metadata and other data collected.

As discussed, the various modules may use a variety of approaches to retrieve data from a third-party operator SaaS service, a cloud device including its virtual machines, administrative logs, and other raw data sources. As such, the probe connectors can be configured based on the specifications of that specific raw data source. For security purposes, the cyber security appliance 100 may prefer that the probe connectors control the data transfer. However, in some instances, the raw data source (itself) may initiate the data transmission to the probes and eventually to the cyber security appliance.

A trigger module may detect time stamped data indicating one or more i) events and/or ii) alerts from I) unusual or II) suspicious behavior/activity are occurring and then triggers that something unusual is happening. Accordingly, the gather module is triggered by specific events and/or alerts of i) an abnormal behavior, ii) a suspicious activity, and iii) any combination of both. The inline data may be gathered on the deployment from a data store when the traffic is observed. The scope and wide variation of data available in the data store results in good quality data for analysis. The collected data is passed to the various modules, such as the cloud module, SaaS module, comparison module and cyber threat module as well as to the data store.

The gather module may comprise of multiple automatic data gatherers that each look at different aspects of the data depending on the particular hypothesis formed for the analyzed event and/or alert. The data relevant to each type of possible hypothesis will be automatically pulled from additional external and internal sources. Some data is pulled or retrieved by the gather module for each possible hypothesis from the data store. A feedback loop of cooperation occurs between the gather module, the SaaS module monitoring SaaS activity, the cloud module monitoring cloud network activity, the comparison module to apply one or more models trained on different aspects of this process, and the cyber threat module to identify cyber threats based on comparisons by the comparison module. Each hypothesis of typical cyber threats can have various supporting points of data and other metrics associated with that possible threat, such as a human user insider attack, inappropriate network behavior, inappropriate SaaS behavior, inappropriate cloud behavior, etc. from a human user. The hypothesis of typical cyber threats to be supported or refuted also includes a malicious software or malware attack that causes inappropriate network behavior, inappropriate SaaS behavior, inappropriate cloud behavior, etc. A machine-learning algorithm will look at the relevant points of data to support or refute that particular hypothesis of what the suspicious activity or abnormal behavior related for each hypothesis on what the suspicious activity or abnormal behavior relates to. Networks have a wealth of data and metrics that may be collected. The gatherer modules may then filter or condense the mass of data down into the important or salient features of data. In an embodiment, the cloud module, the SaaS module, comparison module, and the coordinator module may be portions of the cyber threat module.

A cloud module can be configured to collect and analyze cloud data from the probes. The cloud module can reference one or more machine learning models that are trained on a normal behavior of at least one or more entities associated with the cloud infrastructure environment; and thus, be able to indicate when a behavior of the given entity falls outside of being a normal pattern of life. The cloud module can reference machine learning models that are each trained on a normal behavior of a specific entity associated with the cloud infrastructure environment. Alternatively, the cloud module can reference machine learning models that are each trained on a normal behavior of a group of entities, such a category of entity and its members making up that category of cloud entities, associated with the cloud infrastructure environment. Examples of a cloud infrastructure environment include examples such as Amazon Web Services®, Microsoft Azure®, Google Cloud Platform™, Rackspace®, etc.

Likewise, a SaaS module can be configured to collect third-party event data describing an event of a SaaS application operating on a network entity for use in identifying a cyber threat, in conjunction with the cloud module. Examples of a SaaS application may include Salesforce®, Microsoft Office 365®, Box®, Dropbox®, or Google G-Suite®. The entity represents at least one of a user and a network device executing the SaaS application. A third-party operator may administer the SaaS application. The cyber security appliance 100 can have a probe, such as a cloud connector, a SaaS connector, a vSensor, an OS sensor, etc., hosted by the cyber security appliance and located to communicate with each the SaaS application and/or cloud entity. The at least one connector accesses the administrative event via the third-party operator. The SaaS module can connect to the connector via at least one input port.

The cyber threat module may also use one or more machine-learning models trained on cyber threats in the network. The cyber threat module may reference the models that are trained on the normal behavior of user activity, cloud activity, email activity, SaaS activity, etc. associated with this organization's network.

The one or more machine learning models trained on, for example, the cloud system can examine at least the behaviors of the entities of devices, containers, users, and traffic patterns in the cloud infrastructure environment; and thus, can be used to determine which behaviors fall outside of the normal pattern of life for these entities. Additionally, a determination can be made of what is the likelihood the chain of unusual behaviors from these devices, containers, users, administrative changes, and traffic patterns that fall outside of being the normal benign behavior correspond to a malicious behavior associated with the cyber threat. For example, the models trained on the cloud system can use unsupervised machine learning and AI algorithms to understand and spot the normal benign behavior and deviations in the behavior that correspond to the malicious behavior associated with the cyber threat.

The cyber threat module can use one or more machine learning models trained on cyber threats in the cloud infrastructure environment and examine at least the behaviors of one or more specific entities falling outside of their normal pattern of life. The cyber threat module can then determine what is a likelihood a chain of unusual behaviors under analysis falling outside of being a normal benign behavior is a cyber threat.

The one or more machine learning models can be self-learning models using unsupervised learning and trained on a normal behavior of different aspects of the system, for example, device activity, user activity and network activity as a whole. The self-learning models of normal behavior are consistently updated. The self-learning model of normal behavior can be updated when new input data is received that is deemed within the limits of normal behavior. A normal behavior threshold is used by the model as a moving benchmark of parameters that correspond to a normal pattern of life for the computing system. The normal behavior threshold is varied according to the updated changes in the computer system allowing the model to spot behavior on the computing system that falls outside the parameters set by the moving benchmark.

As discussed, the cyber security appliance 100 may use multiple machine learning models. Each machine learning model may be trained on specific aspects of the normal pattern of life for the system such as devices, users, network traffic flow, administrative tasks, outputs from one or more cyber security analysis tools analyzing the system, and others. One or more machine learning models may also be trained on characteristics and aspects of all manner of types of cyber threats. One or more machine learning models may also be trained by observing vectors for malicious activity, such as network activity or emails themselves.

The cyber threat module can determine a threat risk parameter that factors in how the chain of unusual behaviors correlate to potential cyber threats and 'what is a likelihood of this chain of one or more unusual behaviors of, for example, the SaaS activity, cloud activity, etc. including user, administrative and traffic activity, under analysis, that fall outside of being a normal benign behavior is potentially malicious behavior?'

The comparison module can compare the analyzed metrics on the user activity and network activity compared to their respective moving benchmark of parameters that correspond to the normal pattern of life for the computing system used by the self-learning machine-learning models and the corresponding potential cyber threats.

The comparison module is configured to execute a comparison of input data to at least one machine-learning model to spot behavior on the network deviating from a normal benign behavior of that network entity. The comparison module receives the input data via i) one or more ports in the input output ports externally from one or more probes or ii) from outputs of other cooperating modules. The machine models can use a normal behavior benchmark describing parameters corresponding to a normal pattern of activity for that network entity. The comparison module can use the comparison to identify whether the network entity is in a breach state of the normal behavior benchmark.

The comparison module can be integrated with the cyber threat module. The cyber security appliance 100 may also include one or more machine-learning models trained on gaining an understanding of a plurality of characteristics on a transmission and related data including classifying the properties of the transmission and its meta data. The cyber threat module can then determine, in accordance with the analyzed metrics and the moving benchmark of what is considered normal behavior, a cyber-threat risk parameter indicative of a likelihood of a cyber-threat.

The Cloud module may also reference one or more machine learning models trained on gaining an understanding of a plurality of characteristics on a Cloud infrastructure administrative event and related data including classifying the properties of the Cloud infrastructure administrative event and its meta data.

The cyber threat module can execute an autonomous analyst to use machine-learning to determine whether the network entity in the breach state is a cyber threat. The cyber threat module is configured to identify whether the breach state identified by the comparison module and a chain of relevant behavioral parameters deviating from the normal benign behavior of that network entity correspond to a cyber threat.

The network module monitoring network activity, the cloud module monitoring cloud activity, and the SaaS module monitoring SaaS applications may each feed their data to a coordinator module to correlate causal links between these activities to supply this input into the cyber threat module.

The cyber threat module can also factor behavioral activity in a first environment, such as email, to a particular causal link in a second environment, such as a cloud infrastructure, into its determination of the threat risk parameter. The cyber security appliance 100 uses various probes to collect the user activity, such as network activity and email activity, SaaS activity, cloud activity, and then feed that activity to the data store, as well as the various modules and the machine-learning models. The cyber threat module uses the collected data to draw an understanding of the activity as well as updates a training for the one or more machine-learning models trained on these different domains. For example, email traffic can be collected by putting hooks into the e-mail application, such as Outlook or Gmail, and/or monitoring the Internet gateway from which the e-mails are routed through. Additionally, probes may collect network data and metrics via one of the following methods: port spanning the organizations existing network equipment; inserting or re-using an in-line network tap, and/or accessing any existing repositories of network data.

The cyber security appliance 100 may supplement the data provided to the users and cyber professionals using a researcher module. The researcher module operates an artificial intelligence (AI) algorithm to assess whether the anomalous network activity has previously appeared in other published threat research or known lists of malicious files or Internet addresses. The researcher module can consult internal threat databases or external public sources of threat data. The researcher module can collect an outside data set describing at least one of an action or a state related to the cyber threat present outside of the network from at least one data source outside the network.

The cyber security appliance 100 can then take actions to counter detected potential cyber threats. The autonomous response module, rather than a human taking an action, can be configured to cause one or more rapid autonomous actions to be taken to contain the cyber threat when the threat risk parameter from the cyber threat module is equal to or above an actionable threshold or meets predefined threat conditions. The cyber threat module's configured cooperation with the autonomous response module, to cause one or more autonomous actions to be taken to contain the cyber threat, improves computing devices in the system by limiting an impact of the cyber threat from consuming unauthorized CPU cycles, memory space, and power consumption in the computing devices via responding to the cyber threat without waiting for some human intervention.

The autonomous response module can interact with the SaaS module, cloud module, and the cyber threat module to automatically respond to any issues with a SaaS application or cloud issue. As discussed, the cyber threat module may generate a threat risk parameter listing a set of values describing aspects of a potential cyber threat. The autonomous response module is configured to identify at least one autonomous response to take in response to the cyber threat based on the threat risk parameter. The autonomous response can be, for example, alerting an internal system administrator, alerting the third-party operator, reducing permissions, shutting down a device or port, disabling a user account, and other actions that regulate machine and/or network connectivity, as well as altering user permissions. A user, via a user interface, may select one or more autonomous actions to take when the cyber threat module detects a cyber threat of a given type based on the threat risk parameter.

The autonomous response module may also tag a specific user or category of users to have a lower threshold for an autonomous response, depending on the circumstances of the cyber threat. For example, a chief financial officer can cause much damage to a company by making financial transactions to embezzle funds. If the cyber threat module has been set to lower an actionable threshold for the autonomous response upon identifying a tagged user associated with a cyber threat of a financial nature, the autonomous response module can lower the threat risk parameter for the actionable threshold for the autonomous response when the tagged user performs such potentially malicious activity. The autonomous response module can simultaneously employ a number of different clustering methods including matrix-based clustering, density based clustering, and hierarchical clustering techniques to identify types of cyber threats.

The cyber security appliance 100 may be hosted on a device, on one or more servers, or in its own cyber threat appliance platform.

An example chain of unusual behavior for the cloud in connection with the rest of the network under analysis is discussed below.

The user interface can display a graph of an example chain of unusual behavior for a cloud platform in connection with the rest of the network under analysis.

The cyber threat module cooperates with one or more machine learning models. The one or more machine learning models are trained and otherwise configured with mathematical algorithms to infer, for the cyber threat analysis, 'what is possibly happening with the chain of distinct alerts and/or events, which came from the unusual pattern of behaviors,' and then assign a threat risk parameter associated with that distinct item of the chain of alerts and/or events forming the unusual pattern.

This is 'a behavioral pattern analysis' of what are the unusual behaviors of the entity, such as a network, a system, a device, a user, or an email, virtual machine, SaaS application, traffic flow, under analysis by the various modules and the machine learning models. The cyber security appliance 100 uses unusual behavior deviating from the normal behavior and then builds a chain of unusual behavior and the causal links between the chain of unusual behavior to detect potential cyber threats.

An example behavioral pattern analysis of what are the unusual behaviors may be as follows. The unusual pattern may be determined by filtering out what activities, events, alerts, etc. that fall within the window of what is the normal pattern of life for that entity under analysis. Then the pattern of the deviant behavior of the activities, events, alerts, etc. that are left, after the filtering, can be analyzed to determine whether that pattern is indicative of a behavior of a malicious actor, such as a human, a program, an email, or other threat. The cyber security appliance 100 can go back and pull in some of the filtered out normal activities to help support or refute a possible hypothesis of whether that pattern is indicative of a behavior of a malicious actor. An example behavioral pattern included in the chain is shown in the graph over a time frame of, an example, 7 days. The cyber security appliance 100 detects a chain of anomalous behavior of unusual data transfers three times, unusual characteristics in Cloud activity in the monitored system three times, which seem to have some causal link to the unusual data transfers. Likewise, twice unusual credentials tried unusual behavior of trying to access to sensitive areas or malicious IP addresses and the user associated with the unusual credentials trying unusual behavior has a causal link to at least one of those three cloud activities with unusual characteristics. When the behavioral pattern analysis of any individual behavior or of the chain as a group is believed to be indicative of a malicious threat, then a score of how confident the cyber security appliance 100 is in this assessment of identifying whether the behavior is unusual is created.

An additional point to note is that whilst all network traffic and activity in external locations (such as SaaS or Cloud) is ingested, various machine learning models perform filtering to isolate what is unusual for the highest level of analysis. This means a large amount of data can be excluded at every level which greatly reduces the amount of calculations needed on a continuous basis. This speeds up the analysis to allow near real time analysis of unusual behaviors occurring and being able to rapidly determine if those unusual behaviors actually correlate to a potential cyber threat.

Next, also assigned is a threat level parameter (e.g. score or probability) indicative of what level of threat does this malicious actor pose to the system. These can be combined/factored into a single score. The score may be an actual score, a percentage, a confidence value, or other indicator on a scale. Lastly, the cyber security appliance 100 is configurable in its user interface of the cyber security appliance 100 on what type of automatic response actions, if any, the cyber security appliance 100 may take when for different types of cyber threats that are equal to or above a configurable level of threat posed by this malicious actor.

As discussed, the cyber threat module may chain the individual alerts and events that form the unusual pattern into a distinct item for cyber threat analysis of that chain of distinct alerts or events. The cyber threat module may reference the one or more machine learning models trained on cyber threats to identify similar characteristics from the individual alerts, events, traffic patterns, etc. forming the distinct item made up of the chain of alerts or events forming the unusual pattern.

As discussed, one or more machine learning models may also be trained on characteristics and aspects of all manner of types of cyber threats to analyze the threat risk associated with the chain or cluster of alerts or events forming the unusual pattern. The machine learning technology, using advanced mathematics, can detect previously unidentified threats, without relying on prescribed rules, and automatically defend networks.

The models may perform by the threat detection through a probabilistic change in normal behavior through the application of an unsupervised Bayesian mathematical model to detect behavioral change in computers and computer networks. The core threat detection system is termed the 'Bayesian probabilistic'. The Bayesian probabilistic approach can determine periodicity in multiple time series data and identify changes across single and multiple time series data for the purpose of anomalous behavior detection. From the, for example, cloud and SaaS raw sources of data, a large number of metrics can be derived each producing time series data for the given metric.

The detectors in the cyber threat module, the cloud module, and the SaaS module can be discrete mathematical models that implement a specific mathematical method against different sets of variables with the target. Thus, each model is specifically targeted on the pattern of life of alerts and/or events coming from, for example, i) that cyber security analysis tool, ii) analyzing various aspects of the third-party SaaS interactions, and iii) analyzing various aspects of the cloud data, metadata, and or administrative changes coming from specific devices and/or users within a system, etc.

At its core, the cyber security appliance 100 mathematically characterizes what constitutes 'normal' behavior based on the analysis of a large number/set of different measures of a devices network behavior. The cyber security appliance 100 can build a sophisticated 'pattern of life'—that understands what represents normality for every person, device, email activity, and network activity in the system being protected by the cyber threat defense system.

As discussed, each machine learning model may be trained on specific aspects of the normal pattern of life for the system such as devices, users, network traffic flow, outputs from one or more cyber security analysis tools analyzing the system, email contact associations for each user, email characteristics, characteristics of the SaaS application, the activities and behavior of the SaaS application users, cloud activity, administrative audits, and others. The one or more machine learning models may use at least unsupervised learning algorithms to establish what is the normal pattern of life for the system. The machine learning models can train on both i) the historical normal distribution of alerts and events for that system and ii) a normal distribution information from similar peer systems to establish the normal pattern of life of the behavior of alerts or events for that system.

The machine learning models can leverage at least two different approaches to detecting anomalies: such as comparing each system's behavior to its own history and comparing that system to its peers' history or such as comparing an email to both characteristics of emails and the activities and behavior of its email users. This multiple source comparison allows the models to avoid learning existing bad behavior as 'a normal behavior', because compromised entities, such as devices, users, components, emails will exhibit behavior different to their immediate peers.

In addition, the one or more machine learning models can use the comparison of i) the normal pattern of life for that system corresponding to the historical normal distribution of alerts and events for that system mapped out in the same multiple dimension space to ii) the current chain of individual alerts and events behavior under analysis. This comparison can yield detection of the one or more unusual patterns of behavior within the plotted individual alerts or events, which allows the detection of previously unidentified cyber threats compared to finding cyber threats with merely predefined descriptive objects or signatures. Thus, increasingly intelligent malicious cyber threats, picking and choosing when they take their actions in order to generate low level alerts and event, will still be detected, even though they have not yet been identified by other methods of cyber analysis. These intelligent malicious cyber threats can include malware, spyware, key loggers, malicious links in an email, malicious attachments in an email, and others as well as nefarious internal information technology staff who know intimately how to not set off any high-level alerts or events.

The plotting and comparison are a way to filter out what is normal for that system and then be able to focus the analysis on what is abnormal or unusual for that system. Then for each hypothesis of what could be happening with the chain of unusual events or alerts, the gather module may gather additional metrics from the data store including the pool of metrics originally considered 'normal behavior' to support or refute each possible hypothesis of what could be happening with this chain of unusual behavior under analysis.

Note, each of the individual alerts, events, etc. in a chain of alerts, events, etc. that form the unusual pattern can indicate subtle abnormal behavior. Thus, for example, each alert or event can have a low threat risk parameter associated with that individual alert or event. However, when analyzed as a distinct chain or grouping of alerts or events behavior forming the chain of unusual pattern by the one or more machine learning models, that distinct chain of alerts or events can be determined to now have a much higher threat risk than any of the individual and/or events in the chain.

In addition, modern cyberattacks can be of such severity and speed that a human response cannot happen quickly enough. Thanks to these self-learning advances, a machine may uncover these emerging threats and deploy appropriate, real-time autonomous response actions to fight back against the most serious cyber threats.

The modules in the cyber security appliance cooperating with each other and referencing the machine learning models has the ability to self-learn and detect normality in order to spot true anomalies, allowing organizations of all sizes to understand the behavior of users and machines on their networks at both an individual and group level. Monitoring behaviors, rather than using predefined descriptive objects and/or signatures, means that more attacks can be spotted ahead of time and extremely subtle indicators of wrongdoing can be detected. Unlike traditional legacy defenses, a specific attack type or new malware does not have to have been seen first before it can be detected. A behavioral defense approach mathematically models, for example, machine, cloud, and human activity behaviorally, at and after the point of compromise, in order to predict and catch today's increasingly sophisticated cyber-attack vectors. It is thus possible to computationally establish what is normal, in order to then detect what is abnormal. In addition, the machine learning constantly revisits assumptions about behavior, using probabilistic mathematics. The cyber security appliance's unsupervised machine learning methods do not require training data with pre-defined labels. Instead unsupervised machine learning methods may identify key patterns and trends in the data, without the need for human input.

The user interface and output module may also project the individual alerts and/or events forming the chain of behavior onto the user interface with at least three-dimensions of i) a horizontal axis of a window of time, ii) a vertical axis of a scale indicative of the threat risk assigned for each alert and/or event in the chain and a third dimension of iii) a different color for the similar characteristics shared among the individual alerts and events forming the distinct item of the chain. The different color may be red, blue, yellow, or others. For gray scale, the user interface may use different shades of gray, black, and white with potentially different hashing patterns.

Figure 2:
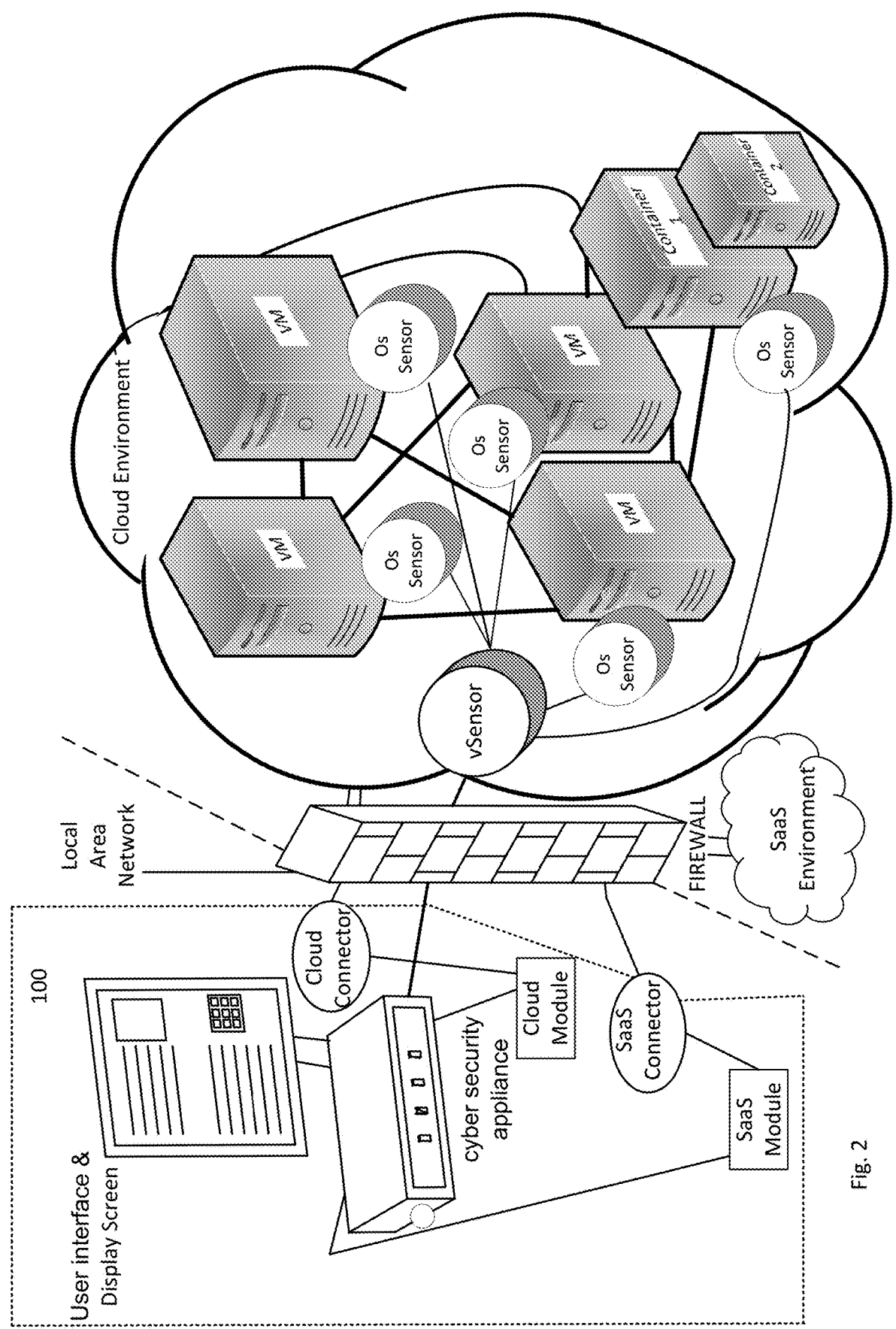

FIG. 2 illustrates a diagram of an embodiment of modules in the cyber security appliance communicating with a set of probes to examine at least the behaviors of i) administrative changes in the cloud infrastructure environment, ii) traffic that flows between the two or more cloud infrastructure elements reliant on packet transmission in a virtual environment, and iii) virtual traffic that leaves the virtual environment in the cloud infrastructure environment and then travels over a physical network.

The various modules, including the cloud module, and the one or more machine learning models trained on the cloud infrastructure environment, examine at least the behaviors of i) administrative changes in the cloud infrastructure environment, ii) traffic that flows between the two or more cloud infrastructure elements reliant on packet transmission in a virtual environment, and iii) virtual traffic that leaves the virtual environment in the cloud infrastructure environment and then travels over a physical network, as captured and fed back to the modules over a secure connection, such as a private virtual channel, by the probes. The modules in the cyber security appliance 100 may connect to the probes through a firewall.

A cloud application has remote cloud-based and local client components that work together. Thus, an application in the cloud may be distributed across both physical and virtual environments, with generally the database tier residing on the physical server while the web and app tiers are virtualized. Generally, the remote servers have the heavy processing logic (e.g. processors and memory capacity) that spin up one or more virtual machines for the one or more cloud applications that are accessed by the local clients through an Internet connection or private LAN connection. Cloud application' servers typically can be located in a remote data center operated by a third-party cloud services infrastructure provider. Cloud-based applications may encompass email, file storage and sharing, order entry, inventory management, word processing, customer relationship management (CRM), data collection, financial accounting, etc.

The probes are constructed with several different types to monitor the virtual and physical aspects of the cloud infrastructure environment. The probes securely communicate with the modules of the cyber security appliance 100 via for example a private virtual channel. The probes may at least include, one or more of a first type of sensors, such as operating system (OS) sensors, that are configured to be installed on each cloud endpoint, one or more of a second type of sensors, such as a cloud connector, that are configured to monitor the administrative changes in the cloud infrastructure environment, and one or more of a third type of sensors, such as virtual (v)sensors, that are configured to capture a record of the virtual traffic that flows between the virtual machines (VM) by aggregating VM traffic fed from one or more the first type of sensors as well as VM traffic that leaves the virtual environment and travels over the physical network.

Virtual traffic between virtual machines residing on the same hypervisor can be difficult to monitor. This is because inter-VM traffic is switched locally on a virtual switch, as opposed to a physical switch, and so never makes it down to the physical network wire where that VM traffic can be observed. However, the various probes can be coded to install and perform various functions in the virtual environment.

The first type of sensors and the third type of sensors can be installed either by spanning virtual traffic into a specified virtual machine and/or by installing the first type of sensor directly onto a virtual machine in a managed hosting service. The three or more types of sensors offer visibility into a cloud and its virtual infrastructure, including inter-VM traffic, and allow for scalability, without significantly impacting server performance.

The third type of sensors are lightweight software components that extend visibility in virtualized environments. The third type of sensors software can be installed as a 'virtual appliance' configured to receive a SPAN from the virtual network switch. This allows the third type of sensor to capture a record of all traffic between cloud infrastructure elements reliant on packet transmission (such as Containers, Virtual Machines etc.), in essence, without a single packet being lost or dropped by the system. The third type of sensor stores the packet captures on a rolling basis, optimizing the disk space and I/O performance and ensuring that there is minimal impact on the performance of the server. Note, merely one of the third type of sensors needs to be installed on each hardware server. An instance of the third type of sensor can be installed on each of the hardware servers, allowing for scalability via connecting to multiple instances of the first type of sensor. The third type of sensor can extract merely the relevant metadata and send the traffic ingested onto the cyber security appliance 100 efficiently and securely, wherever the cyber security appliance 100 is located on the physical network. The third type of sensor can be distributed in industry-standard formats, such as Open Virtualization Formats (OVF), representing a virtual (software) appliance.

The first type of sensor can be a host-based server agent that intelligently extracts copies of network traffic for aggregation by the third type of sensor, and subsequent analysis by the cyber security appliance 100. The first type of sensor are easily installed onto virtual machines in the cloud and are coded to dynamically configure themselves to install while avoiding data duplication and streamline bandwidth use.

Again, one or more of the first type of sensors, such as OS-Sensors, send copies of network traffic to a local third type of sensor, such as a (v)sensor, deployed in the same cloud environment. The third type of sensor is configured to capture a record of the virtual traffic that flows between the two or more cloud infrastructure elements reliant on packet transmission in the virtual environment and aggregate that VM traffic in the same virtual environment. The receiving third type of sensor processes the data and feeds it back to the modules in the cyber security appliance 100, which correlates behavior across the organization's cloud and physical environments. The third type of sensors is configured to interact with cloud infrastructure entities with network tapping capabilities (such as supported virtual switches or the first type of sensor acting as a virtual tap on single hosts, etc.) in order to mirror and access virtual traffic that leaves the virtual environment and travels over the physical network. The third type of sensor, in essence, captures the traffic that flows between cloud infrastructure elements inside the cloud and over the physical network.

Next, the sensors can be configured for functions other than monitoring and collecting data.

For example, the first type of sensors can be further configured to cooperate with the autonomous response module to carry out some of the autonomous actions to counter a potential cyber threat through the first type of sensor.

One or more of a second type of sensors, such as Cloud Connectors, are also configured to cooperate with the cloud module to gather profiling data from the cloud infrastructure environment for the cyber security environment. Distinct from event data—a consistently updated audit of cloud infrastructure activity from users and network entities— outline profile data is information about general virtualized network hygiene and compliance with recommended best practice. Note, profile data is requested, received and processed through the same outlined method as event data, the distinction is made here to indicate the different application. This outline profile data allows the cyber security appliance to alert an operator that elements of the environment pose potential cyber threats, such as whether credential sharing or weak passwords exist across the user base for the cloud infrastructure environment. One example implementation is to run a check from the cyber security appliance 100 on and through the second type of sensors to implement a method of mapping the cloud infrastructure environment to highlight any virtual-machines which are not covered by the first type of sensors and therefore not monitored by the cyber security appliance.

Profiling the cloud infrastructure environment may also be used to simplify existing security tasks to remove user error and increase efficiency. In a further example implementation, the second type of sensors may be configured to receive a list of IP addresses of the one or more virtual machines and provide these to the dynamic blacklisting tool of the autonomous response module of the cyber security appliance. The cyber security appliance makes this list available to the network firewall, ensuring a secure connection is possible without needing to obtain a firewall exception, each time, to access the one or more virtual machines. This removes the possibility of a human operator creating firewall exceptions for incorrect IP addresses whether through human error or malicious intent.

The modules of the cyber security appliance 100 securely communicate with the three types of probes/sensors to see both the internal traffic between cloud infrastructure elements reliant upon packet transmission, virtualized traffic that goes to the external physical network, and audit the platform administrative changes/admin information with the second type of sensors, such as Cloud Connectors.

One or more of a second type of sensors, such as Cloud Connectors, can be hosted on the cyber security appliance and located to communicate with each Cloud infrastructure platform. The second type of sensors monitor the administrative changes in the cloud infrastructure environment that may not be seen at the OS-Sensor level, such as logins, file changes, or data transfer permissions. The second type of sensors extend visibility and detection capabilities to cloud based offerings. This allows anomalous behaviors to be detected, extending the defense provided by the cyber-security appliance beyond the physical enterprise network and into Cloud environments. The second type of sensor, for an active directory in a cloud environment, can interact directly with the active directory via authenticated HTTPS requests to request a log of events of what is happening from a directory, allowing user interactions to be processed into categories and monitored by the modules and data store. The second type of sensor can use the HTTPS requests to obtain the audit logs as well as can send a request to the API, when available, to generate a report when that enhances the data (i.e. more data rich than the audit log by itself).

The second type of sensor can monitor administrative changes, via sets of queries, known as polls. By default, the second type of sensor, for an Active Directory, polls for new administrative events at regular intervals such as, for example every 60 seconds. In order to achieve highly accurate, real-time monitoring, high frequency polling is recommended.

Next, the cloud module and the SaaS module are further configured to take a varied list of events, alerts, and metrics from the probes and then organize them into one of several distinct granular categories. The logic in that cloud module and/or SaaS module knows the different categories and types of information that generally go into a particular category. The cloud module and the SaaS module can place the varied list of events, alerts, and metrics from the probes into a most appropriate category. Each category can appear on the threat visualizer user interface. The category can also be drilled into by the user of the user interface to see further details of the metrics, alerts, and events. This allows events to be easily identified and models to be written which can identify similar unusual activity on a range of different cloud connectors. These distinct granular categories can include, for example: Login; Failed login; Resource viewed; Resource modified; File uploaded; File Downloaded; Resource created; Resource deleted; Sharing; Administrative change to user permissions; Administrative change to device permissions; Miscellaneous; etc.

The cyber threat module is further configured to use the information about relevant changes in the cloud infrastructure environment from the probes and then contextualize i) this cloud information with ii) network traffic information from the probes in the local area network, and, if any exists, iii) relevant behavior of an entity under analysis outside the cloud infrastructure environment from the probes, to analyze what is the likelihood the chain of unusual behaviors, under analysis, that fall outside of being the normal behavior being malicious activity; and thus, is a cyber threat. For example, an information technology user in the normal pattern of life may access cloud environments with infrastructure elements such as virtual machines, databases and container. The user may access a rare URL, download an usually a large file and then is observed using a protocol associated with cryptocurrency mining software. The rare URL, the large download and the unusual protocol are all found to be outside the normal pattern of life for the user. The downloading and running of the cryptocurrency software on the hardware device is outside of the cloud infrastructure environment but this network activity considered when analyzing what is the likelihood the chain of unusual behaviors under analysis that fall outside of being the normal behavior being malicious activity; and thus, a potential cyber threat. The cyber security appliance chooses to restrict the associated user's access to the cloud infrastructure environment until an analyst can investigate. Although the user is demonstrating usual activity in the cloud in comparison to their pattern of life, their actions in the network and their detected level of authority in the cloud environment (permission to create virtual machines) leads the cyber security appliance to autonomously restrict their access to avoid further crypto-currency related misuse.

As discussed, the first type of sensors can be further configured to cooperate with the autonomous response module to carry out some of the autonomous actions to counter a potential cyber threat through the first type of sensor. The autonomous response module is further configured to know when to cause the one or more autonomous actions to be taken, via a user interface setting that allows a selection of different autonomous actions to be taken to counter the cyber threat, based on a set of conditions. The set of conditions can be a setting such as i) when the cyber-threat risk parameter indicative of the likelihood of the cyber-threat is equal to or above the actionable threshold and the actionable threshold is a threat level score, ii) always act when a predefined scenario with a programmable set of behaviors, unusual or not unusual, is detected which autonomously triggers the one or more actions to occur, iii) act on the chain of unusual behaviors at two or more different times when the cyber-threat risk parameter indicative of the likelihood of the cyber-threat, via another user interface setting is configured to programmably allow a set one or more different users and/or category of users of the cloud infrastructure environment to have a different threat level score needed to trigger the one or more autonomous actions to occur, or iv) any combination of these three. Note, the score may be an actual score, a percentage, a confidence value, or other indicator on a scale.

Examples of actions taken by the autonomous response module may include: i) stopping or slowing down activity related to a specific threat, ii) quarantining or semi-quarantining users, systems, and/or devices iii) marking specific pieces of content, such as email, for further investigation or tracking, iv) changing administrative permissions, v) and other actions that regulate machine and/or network connectivity, as well as altering user permissions.

The second type of sensors can be configured to cooperate with the autonomous response module to respond to any threat detected by the cyber security appliance, whether residing in the SaaS, Network, Cloud or another domain. It can be advantageous to restrict user permissions to modify or administer the cloud environment if anomalous, potentially malicious behavior is associated with that user elsewhere on the extended network observed by the cyber security appliance. Examples of actions taken by the autonomous response module through the second type of sensor may include: i) blocking specific cloud infrastructure users ii) change passwords to prevent logins and restrict IP addresses from which logins can be performed, iii) update network security rules to restrict virtual machines or infrastructure elements from reaching the internet by deriving their IP address from a first type of sensor installed on the affected host iv) shut down virtual machines altogether v) and other actions that regulate machine and/or network connectivity, as well as altering user permissions.

Note, another type of probe is a SaaS Connector. SaaS Connectors can be hosted on the cyber security appliance and located to interact directly with the SaaS vendor's security API, via HTTPS requests. This allows user interactions to be processed and monitored by the SaaS module and other modules in the cyber security appliance 100 quickly and consistently, whether they originate inside the network or from remote locations.

Figure 3:
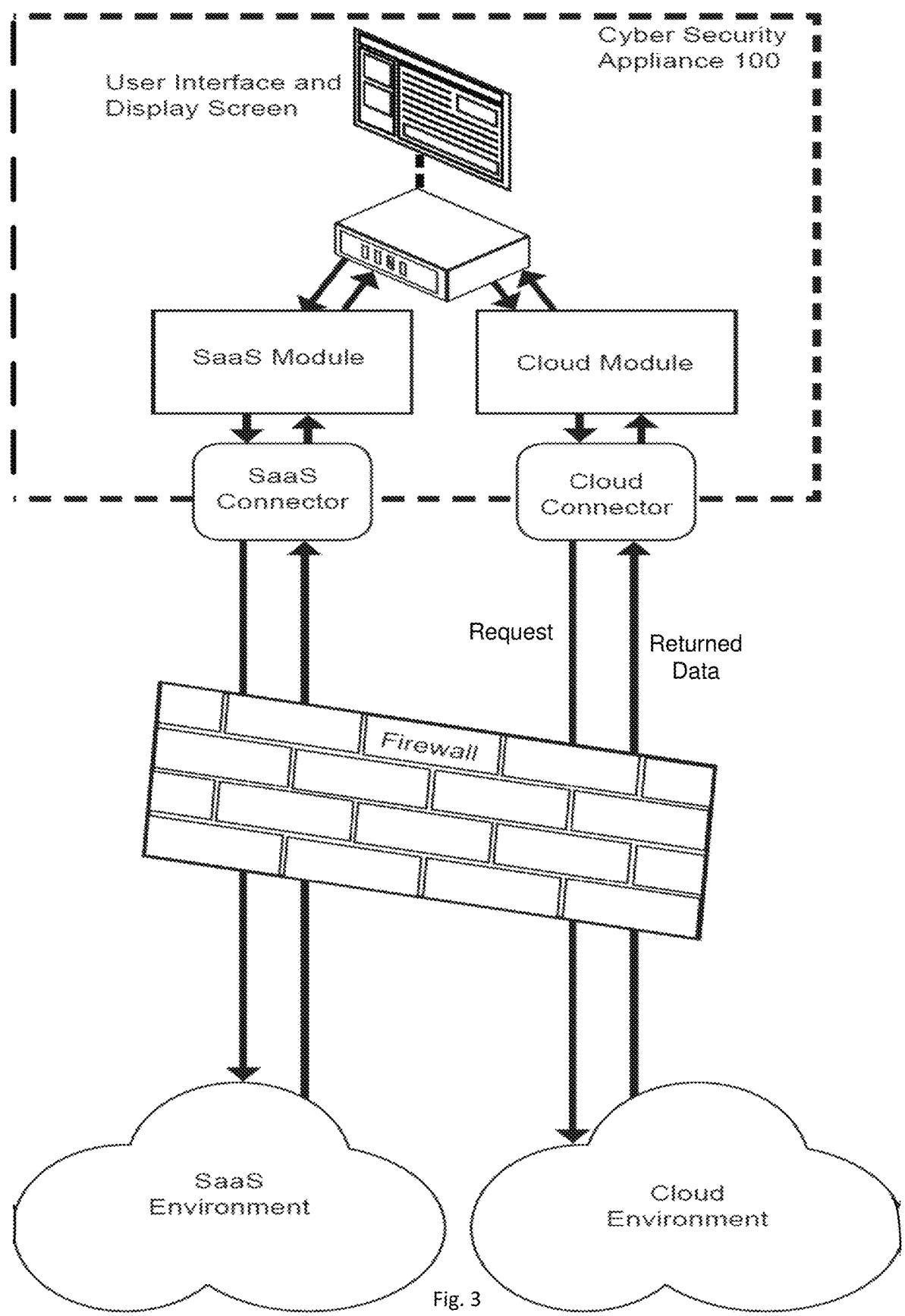
FIG. 3 illustrates a diagram of an embodiment of a cloud module and a SaaS module collecting data to contextualize cloud and SaaS events to link those events and better understand an entity's behavior by considering the SaaS metrics and events as well as the cloud metrics and events as an interconnected whole rather than separate realms.

The user interface can cooperate with at least the cloud module and SaaS module to display; and thereby, allow a viewer of the user interface on a display screen to contextualize Cloud and SaaS events in light of network traffic from the probes on the same user interface (Also see FIG. 3). The user interface is configured to be able to pivot between SaaS metrics, Cloud metrics, and other metrics to link those events and better understand an entity's behavior under analysis by considering the SaaS metrics and events as well as the cloud metrics and events as an interconnected whole rather than separate realms. FIG. 3 illustrates a diagram of an embodiment of a cloud module and a SaaS module collecting data to contextualize cloud and SaaS events to link those events and better understand an entity's behavior by considering the SaaS metrics and events as well as the cloud metrics and events as an interconnected whole rather than separate realms. Note, both SaaS infrastructure and cloud infrastructure environments have portions of that infrastructure controlled by the organization deploying the cyber security appliance and a third party provider responsible for operating and maintaining another portion of that infrastructure. A Shared Responsibility Model can delineate the respective areas of the cloud infrastructure environment or SaaS infrastructure environment that i) third party providers and ii) customer organizations are expected to manage and secure. While the customer's portion of the Shared Responsibility Model varies across SaaS and cloud, the general thrust of the Model plainly illustrates that outsourcing certain IT processes to the cloud or SaaS does not amount to outsourcing your security function altogether. Nonetheless, a cyber security appliance may not have the authority or enough visibility to take autonomous actions on the third party provider's portion of the infrastructure.

Integrating Software-as-a-Service

Figure 4:
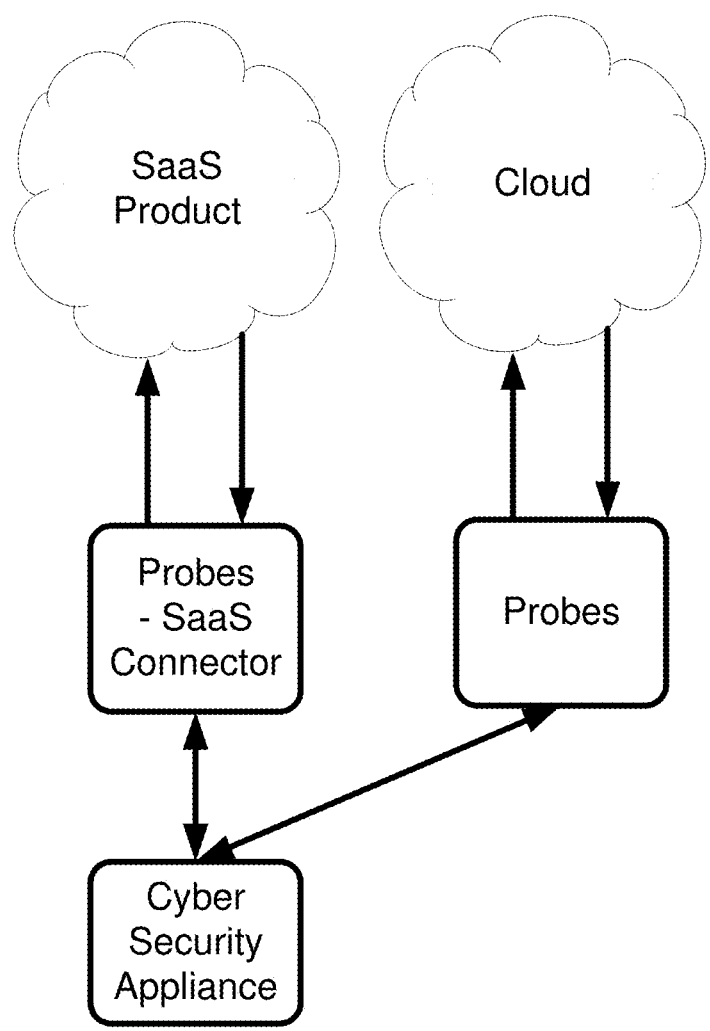
FIG. 4 illustrates a diagram of an embodiment of modules in the cyber security appliance communicating with a set of probes that integrate Software-as-a-Service and cloud analysis.

FIG. 4 illustrates a diagram of an embodiment of modules in the cyber security appliance communicating with a set of probes that integrate Software-as-a-Service and cloud analysis.

A Software-as-a-Service (SaaS) application licenses a software application/product to a user on a periodic basis, such as Microsoft Office 365®, Salesforce®, Dropbox®, Box® and Google G-Suite®. The added benefit of these applications is that the SaaS developer centrally hosts the functions of the application. The SaaS application can leverage this centralized hosting to expand the functionality of the SaaS application beyond the capabilities of a single user device. However, as the hosting is controlled by a third-party, the centralized hosting renders accessing performance data more difficult. A cyber security appliance 100 can access an appropriate data application programming interface (API) to access logs that expose all actions that occur within the SaaS environment and which the cyber security appliance has the authority to view. Note, administrators of the SaaS environment must grant explicit permissions to the cyber security appliance to view administrative events and may limit the authority granted, consequently restricting the events visible to the appliance. Thus, the cyber security appliance 100, using a self-learning attack detection system, can operate across the entirety of an on-premise or cloud digital networks, as well as across any SaaS facilities used in an organization. Thus, the cyber security appliance 100 can access all the computing, networks and devices that can be found in company properties, as well as rented cloud facilities and SaaS services.

Using the SaaS module, the cyber security appliance 100 learns the normal "pattern of life" of all communications-network-connected elements of an on-premise and remote digital ecosystem. Further, the cyber security appliance 100 can use a SaaS module to learn the interactions of the user with data and services within the SaaS services, referred to as administrative events. For example, the SaaS module can detect when a user reads a file, shares a file, starts a server, deletes a server, sends an email, and other actions. The SaaS module can supply this data to the one or more machine learning models for training on a normal behavior. Once "normal behavior" has been learned, the cyber security appliance 100 is capable of identifying unexpected or unusual behaviors from devices, software, or operators of devices and SaaS services.

Such unusual behavior might be a result of misconfiguration, accidental use, malicious use by a legitimate operator, or malicious use by a third-party. The SaaS immune system has no prior assumptions and is capable of learning about the behavior of any device or person in on-premise environments, remote environments, and even third-party environments. The cyber security appliance 100 uses many different machine learning and artificial intelligence techniques that compete to learn the best possible pattern of life for individual devices or people, as well as subsets of their behavior.

The cloud behavioral information can be collected as previously discussed in FIGS. 2 through 4.

The cyber security appliance 100 can learn the similarities of behavior in groups of people and devices. The cyber security appliance 100 can cluster these groups to develop a baseline of "normal behavior" across the group. The cyber security appliance 100 can then recognize when a person or device is in the cluster is deviating from this "normal behavior".

The cyber security appliance 100 recognizes associated chains of behaviors. For example, an attack begins by subverting a public relations officer's laptop in a corporate environment. The attack spreads to computer systems in the procurement division. The procurement division is able to access customer information in the SaaS environment. The attack spreads into this SaaS arena. The attack begins to manipulate the data in the SaaS environment with the potential for deliberate harm. All stages of this attack can be identified by the cyber security appliance 100 and presented together in context to a security professional at the home network with the ability to pivot to the SaaS environment for further investigation.

The cyber security appliance 100 can present its summarized findings and enable further human investigation into the unusual behavior to determine whether this behavior represents an actual attack of even a damaging user error. The cyber security appliance 100 can autonomously respond to the unusual behavior, if an attack is indicated, in an automatic way that prevents the attack from progressing further. For example, the autonomous response module of the cyber security appliance 100 can mandate that the user involved in the unusual behavior is locked from accessing any SaaS platform, not limited to the SaaS platform on which the unusual behavior occurred or specifically restricted from accessing certain files or resources. Unusual network activity, such as unusually large data downloads, can trigger the autonomous response module to restrict user access to SaaS systems. Autonomous responses of many forms can successfully occur until a human has verified that the unusual behavior is allowed or should be blocked indefinitely.

In an embodiment, the cyber security appliance 100 is configured to operate across the entirety of the "SaaS" environment and traditional computing mechanisms in an organization. For example, the cyber security appliance 100 can incorporate the oversight of data accesses, data sharing, and data changes in third-party hosted applications, such as Salesforce®, Dropbox®, Office 365 ®, as well as the traditional corporate facilities found in offices and datacenters.

The example network can include one or more firewalls, one or more network switches, one or more computing devices operable by users of the network, bridges, databases, and one or more cyber security appliances 100. The system uses machine learning/Artificial Intelligence to understand what is normal inside a company's network, and when something's not normal. The autonomous response module of the cyber security appliance 100 may invoke automatic responses to disrupt the cyber-attack until the human team can catch up or at the very least suggest a response it wants to take. This could include interrupting connections, preventing the sending of malicious emails, preventing file access, preventing communications outside of the organization, etc. The approach begins in as surgical and directed way as possible to interrupt the attack without affecting the normal behavior of say the user of the cloud system, but if the attack escalates, it may ultimately become necessary to quarantine a device or the user to prevent wider harm to an organization.

Figure 5:
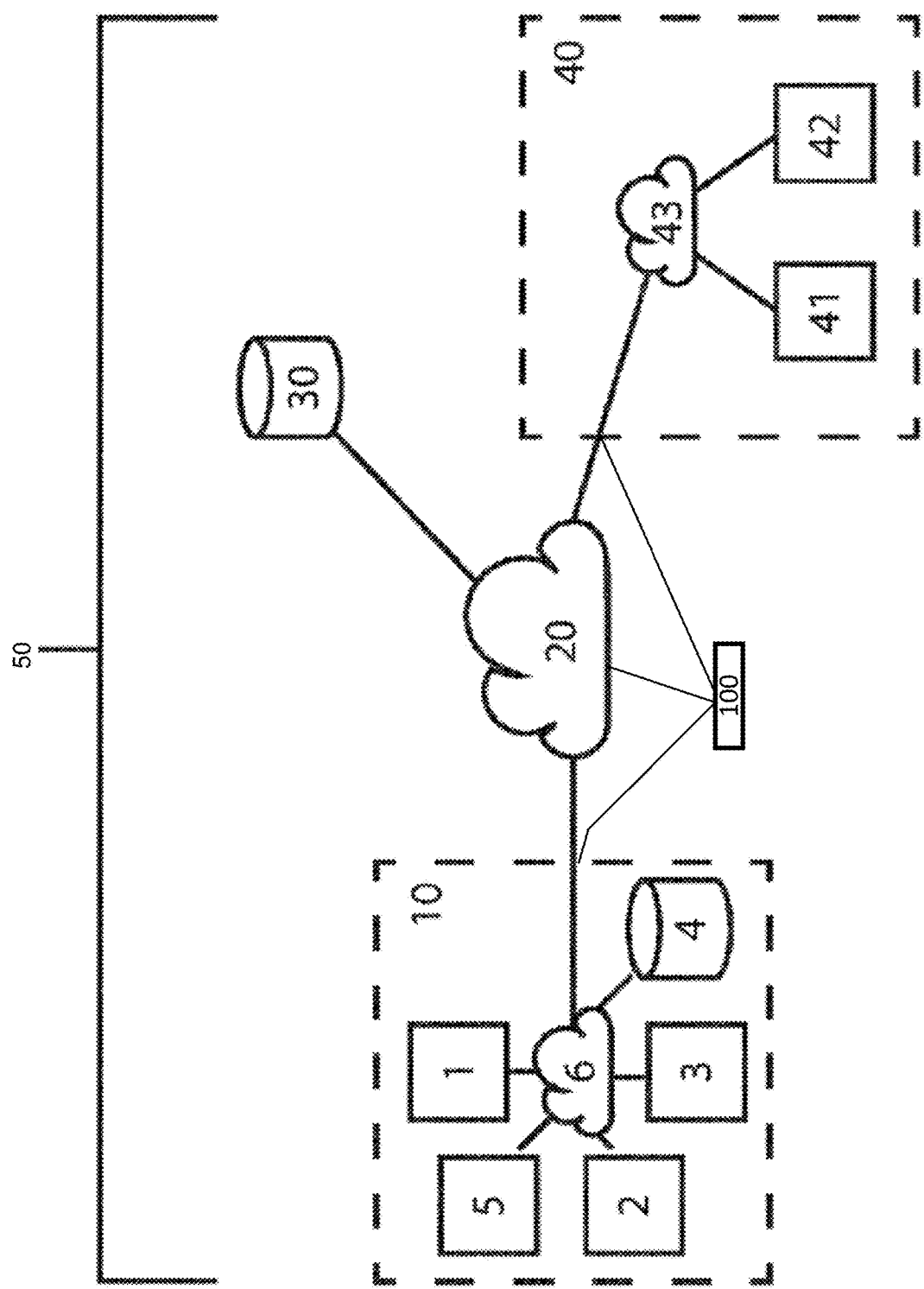
FIG. 5 illustrates an example cyber defense appliance protecting an example network.

FIG. 5 illustrates an example cyber threat defense system, including the cyber defense appliance and its appliance extensions, protecting an example network. The example network FIG. 5 illustrates a network of computer systems 50 using one or more cyber defense appliances 100. The system depicted by FIG. 5 is a simplified illustration, which is provided for ease of explanation of the invention. The system 50 comprises a first computer system 10 within a building, which uses the threat detection system to detect and thereby attempt to prevent threats to computing devices within its bounds. The first computer system 10 comprises three computers 1, 2, 3, a local server 4, and a multifunctional device 5 that provides printing, scanning and facsimile functionalities to each of the computers 1, 2, 3. All of the devices within the first computer system 10 are communicatively coupled via a Local Area Network 6. Consequently, all of the computers 1, 2, 3 are able to access the local server 4 via the LAN 6 and use the functionalities of the MFD 5 via the LAN 6.

The LAN 6 of the first computer system 10 is connected to the Internet 20, which in turn provides computers 1, 2, 3 with access to a multitude of other computing devices including server 30 and second computer system 40. Second computer system 40 also includes two computers 41, 42, connected by a second LAN 43.

In this exemplary embodiment of the invention, cyber defense appliance 100 has the threat detection system and therefore runs the threat detection method for detecting threats to the first computer system. As such, it comprises a processor arranged to run the steps of the process described herein, memory required to store information related to the running of the process, as well as a network interface for collecting the required information. This method shall now be described in detail with reference to FIG. 5.

The cyber defense appliance 100 builds and maintains a dynamic, ever-changing model of the 'normal behavior' of each user and machine within the system 10. The approach is based on Bayesian mathematics, and monitors all interactions, events and communications within the system 10—which computer is talking to which, files that have been created, networks that are being accessed.

For example, computer 2 is based in a company's San Francisco office and operated by a marketing employee who regularly accesses the marketing network, usually communicates with machines in the company's U.K. office in second computer system 40 between 9:30 AM and midday, and is active from about 8:30 AM until 6 PM. The same employee virtually never accesses the employee time sheets, very rarely connects to the company's Atlanta network and has no dealings in South-East Asia. The threat detection system takes all the information that is available relating to this employee and establishes a 'pattern of life' for that person, which is dynamically updated as more information is gathered. The 'normal' model is used as a moving benchmark, allowing the system to spot behavior on a system that seems to fall outside of this normal pattern of life, and flags this behavior as anomalous, requiring further investigation.

The threat detection system is built to deal with the fact that today's attackers are getting stealthier and an attacker may be 'hiding' in a system to ensure that they avoid raising suspicion in an end user, such as by slowing their machine down, using normal software protocol. Any attack process thus stops or 'backs off' automatically if the mouse or keyboard is used. However, yet more sophisticated attacks try the opposite, hiding in memory under the guise of a normal process and stealing CPU cycles only when the machine is active, in an attempt to defeat a relatively-simple policing process. These sophisticated attackers look for activity that is not directly associated with the user's input. As an APT (Advanced Persistent Threat) attack typically has very long mission windows of weeks, months or years, such processor cycles can be stolen so infrequently that they do not impact machine performance. But, however cloaked and sophisticated the attack is, there will always be a measurable delta, even if extremely slight, in typical machine behavior, between pre and post compromise. This behavioral delta can be observed and acted on with the form of Bayesian mathematical analysis used by the threat detection system installed on the cyber defense appliance 100.

The cyber defense self-learning platform uses machine-learning technology. The machine learning technology, using advanced mathematics, can detect previously unidentified threats, without rules, and automatically defend networks. Note, today's attacks can be of such severity and speed that a human response cannot happen quickly enough. Thanks to these self-learning advances, it is now possible for a machine to uncover emerging threats and deploy appropriate, real-time responses to fight back against the most serious cyber threats.

The cyber threat defense system builds a sophisticated 'pattern of life'—that understands what represents normality for every person, device, and network activity in the system being protected by the cyber threat defense system.

The threat detection system has the ability to self-learn and detect normality in order to spot true anomalies, allowing organizations of all sizes to understand the behavior of users and machines on their networks at both an individual and group level. Monitoring behaviors, rather than using predefined descriptive objects and/or signatures, means that more attacks can be spotted ahead of time and extremely subtle indicators of wrongdoing can be detected. Unlike traditional legacy defenses, a specific attack type or new malware does not have to have been seen first before it can be detected. A behavioral defense approach mathematically models both machine and human activity behaviorally, at and after the point of compromise, in order to predict and catch today's increasingly sophisticated cyber-attack vectors. It is thus possible to computationally establish what is normal, in order to then detect what is abnormal.

This intelligent system is capable of making value judgments and carrying out higher value, more thoughtful tasks. Machine learning requires complex algorithms to be devised and an overarching framework to interpret the results produced. However, when applied correctly these approaches can facilitate machines to make logical, probability-based decisions and undertake thoughtful tasks.

Advanced machine learning is at the forefront of the fight against automated and human-driven cyber-threats, overcoming the limitations of rules and signature-based approaches:

The machine learning learns what is normal within a network—it does not depend upon knowledge of previous attacks.

The machine learning thrives on the scale, complexity and diversity of modern businesses, where every device and person is slightly different.

The machine learning turns the innovation of attackers against them—any unusual activity is visible.

The machine learning constantly revisits assumptions about behavior, using probabilistic mathematics.

The machine learning is always up to date and not reliant on human input. Utilizing machine learning in cyber security technology is difficult, but when correctly implemented it is extremely powerful. The machine learning means that previously unidentified threats can be detected, even when their manifestations fail to trigger any rule set or signature. Instead, machine learning allows the system to analyze large sets of data and learn a 'pattern of life' for what it sees.

Machine learning can approximate some human capabilities to machines, such as:

Thought: it uses past information and insights to form its judgments;

Real time: the system processes information as it goes; and

Self-improving: the model's machine learning understanding is constantly being challenged and adapted, based on new information.

New unsupervised machine learning therefore allows computers to recognize evolving threats, without prior warning or supervision.

Unsupervised Machine Learning

Unsupervised learning works things out without predefined labels. In the case of sorting the series of different animals, the system analyzes the information and works out the different classes of animals. This allows the system to handle the unexpected and embrace uncertainty. The system does not always know what it is looking for, but can independently classify data and detect compelling patterns.

The cyber threat defense system's unsupervised machine learning methods do not require training data with predefined labels. Instead, they are able to identify key patterns and trends in the data, without the need for human input. The advantage of unsupervised learning is that it allows computers to go beyond what their programmers already know and discover previously unknown relationships.

The cyber threat defense system uses unique implementations of unsupervised machine learning algorithms to analyze network data at scale, intelligently handle the unexpected, and embrace uncertainty. Instead of relying on knowledge of past threats to be able to know what to look for, it is able to independently classify data and detect compelling patterns that define what may be considered to be normal behavior. Any new behaviors that deviate from those, which constitute this notion of 'normality,' may indicate threat or compromise. The impact of the cyber threat defense system's unsupervised machine learning on cyber security is transformative:

Threats from within, which would otherwise go undetected, can be spotted, highlighted, contextually prioritized and isolated using these algorithms.

The application of machine learning has the potential to provide total network visibility and far greater detection levels, ensuring that networks have an internal defense mechanism.

Machine learning has the capability to learn when to action automatic responses against the most serious cyber threats, disrupting in progress attacks before they become a crisis for the organization.

This new mathematics not only identifies meaningful relationships within data, but also quantifies the uncertainty associated with such inference. By knowing and understanding this uncertainty, it becomes possible to bring together many results within a consistent framework—the basis of Bayesian probabilistic analysis. The mathematics behind machine learning is extremely complex and difficult to get right. Robust, dependable algorithms are developed, with a scalability that enables their successful application to real-world environments.

Overview

In an embodiment, a closer look at the cyber threat defense system's machine learning algorithms and approaches is as follows.

The cyber threat defense system's probabilistic approach to cyber security is based on a Bayesian framework. This allows it to integrate a huge number of weak indicators of potentially anomalous network behavior to produce a single clear measure of how likely a network device is to be compromised. This probabilistic mathematical approach provides an ability to understand important information, amid the noise of the network—even when it does not know what it is looking for.

Ranking Threats

Crucially, the cyber threat defense system's approach accounts for the inevitable ambiguities that exist in data, and distinguishes between the subtly differing levels of evidence that different pieces of data may contain. Instead of generating the simple binary outputs 'malicious' or 'benign,' the cyber threat defense system's mathematical algorithms produce outputs that indicate differing degrees of potential compromise. This output enables users of the system to rank different alerts in a rigorous manner and prioritize those that most urgently require action, simultaneously removing the problem of numerous false positives associated with a rule-based approach.

At its core, the cyber threat defense system mathematically characterizes what constitutes 'normal' behavior based on the analysis of a large number/set of different measures of a devices network behavior, examples include:

Server access;

Data access;

Timings of events;

Credential use;

DNS requests; and other similar parameters.

Each measure of network behavior is then monitored in real time to detect anomalous behaviors.

Clustering

To be able to properly model what should be considered as normal for a device, its behavior must be analyzed in the context of other similar devices on the network. To accomplish this, the cyber threat defense system leverages the power of unsupervised learning to algorithmically identify naturally occurring groupings of devices, a task which is impossible to do manually on even modestly sized networks.

In order to achieve as holistic a view of the relationships within the network as possible, the cyber threat defense system simultaneously employs a number of different clustering methods including matrix based clustering, density based clustering and hierarchical clustering techniques. The resulting clusters are then used to inform the modeling of the normative behaviors of individual devices.

Clustering: At a glance:

Analyzes behavior in the context of other similar devices on the network;

Algorithms identify naturally occurring groupings of devices—impossible to do manually; and Simultaneously runs a number of different clustering methods to inform the models.

Network Topology

Any cyber threat detection system must also recognize that a network is far more than the sum of its individual parts, with much of its meaning contained in the relationships among its different entities, and that complex threats can often induce subtle changes in this network structure. To capture such threats, the cyber threat defense system employs several different mathematical methods in order to be able to model multiple facets of a networks topology.

One approach is based on iterative matrix methods that reveal important connectivity structures within the network.

In tandem with these, the cyber threat defense system has developed innovative applications of models from the field of statistical physics, which allow the modeling of a network's 'energy landscape' to reveal anomalous substructures that may be concealed within.

Network Structure

A further important challenge in modeling the behaviors of network devices, as well as of networks themselves, is the high-dimensional structure of the problem with the existence of a huge number of potential predictor variables. Observing packet traffic and host activity within an enterprise LAN, WAN and Cloud is difficult because both input and output can contain many inter-related features (protocols, source and destination machines, log changes and rule triggers, etc.). Learning a sparse and consistent structured predictive function is crucial to avoid the curse of over fitting.

In this context, the cyber threat defense system has employed a cutting edge large-scale computational approach to learn sparse structure in models of network behavior and connectivity based on applying L1-regularization techniques (e.g. a lasso method). This allows for the discovery of true associations between different network components and events that can be cast as efficiently solvable convex optimization problems and yield parsimonious models.

Recursive Bayesian Estimation

To combine these multiple analyses of different measures of network behavior to generate a single comprehensive picture of the state of each device, the cyber threat defense system takes advantage of the power of Recursive Bayesian Estimation (RBE) via an implementation of the Bayes filter.

Using RBE, the cyber threat defense system's mathematical models are able to constantly adapt themselves, in a computationally efficient manner, as new information becomes available to the system. They continually recalculate threat levels in the light of new evidence, identifying changing attack behaviors where conventional signature-based methods fall down.

The cyber threat defense system's innovative approach to cyber security has pioneered the use of Bayesian methods for tracking changing device behaviors and computer network structures. The core of the cyber threat defense system's mathematical modeling is the determination of normative behavior, enabled by a sophisticated software platform that allows for its mathematical models to be applied to new network data in real time. The result is a system that is able to identify subtle variations in machine events within a computer networks behavioral history that may indicate cyber-threat or compromise.

The cyber threat defense system uses mathematical analysis and machine learning to detect potential threats, allowing the system to stay ahead of evolving risks. The cyber threat defense system approach means that detection no longer depends on an archive of previous attacks. Instead, attacks can be spotted against the background understanding of what represents normality within a network. No pre-definitions are needed, which allows for the best possible insight and defense against today's threats. On top of the detection capability, the cyber threat defense system can create digital antibodies automatically, as an immediate response to the most threatening cyber breaches. The cyber threat defense system approach both detects and defends against cyber threat. Genuine unsupervised machine learning eliminates the dependence on signature-based approaches to cyber security, which are not working. The cyber threat defense system's technology can become a vital tool for security teams attempting to understand the scale of their network, observe levels of activity, and detect areas of potential weakness. These no longer need to be manually sought out, but are flagged by the automated system and ranked in terms of their significance.

Machine learning technology is the fundamental ally in the defense of systems from the hackers and insider threats of today, and in formulating response to unknown methods of cyber-attack. It is a momentous step change in cyber security. Defense must start within.

An Example Method

The threat detection system shall now be described in further detail with reference to a flow of the process carried out by the threat detection system for automatic detection of cyber threats through probabilistic change in normal behavior through the application of an unsupervised Bayesian mathematical model to detect behavioral change in computers and computer networks.

The core threat detection system is termed the 'Bayesian probabilistic'. The Bayesian probabilistic is a Bayesian system of automatically determining periodicity in multiple time series data and identifying changes across single and multiple time series data for the purpose of anomalous behavior detection.

Human, machine or other activity is modeled by initially ingesting data from a number of sources at step S1 and deriving second order metrics at step S2 from that raw data.

The raw data sources include, but are not limited to:
Raw network IP traffic captured from an IP or other network TAP or SPAN port;
Machine generated log files;
Building access ("swipe card") systems;
IP or non IP data flowing over an Industrial Control System (ICS) distributed network;
Individual machine, peripheral or component power usage;
Telecommunication signal strength; and/or
Machine level performance data taken from on-host sources (CPU usage/memory usage/disk usage/disk free space/network usage/etc.)

From these raw sources of data, a large number of metrics can be derived each producing time series data for the given metric. The data are bucketed into individual time slices (for example, the number observed could be counted per 1 second, per 10 seconds or per 60 seconds), which can be combined at a later stage where required to provide longer range values for any multiple of the chosen internal size. For example, if the underlying time slice chosen is 60 seconds long, and thus each metric time series stores a single value for the metric every 60 seconds, then any new time series data of a fixed multiple of 60 seconds (120 seconds, 180 seconds, 600 seconds etc.) can be computed with no loss of accuracy. Metrics are chosen directly and fed to the Bayesian probabilistic by a lower order model which reflects some unique underlying part of the data, and which can be derived from the raw data with particular domain knowledge. The metrics that are obtained depends on the threats that the system is looking for. In order to provide a secure system, it is common for a large number of metrics relating to a wide range of potential threats to be obtained. Communications from components in the network contacting known suspect domains.

The actual metrics used are largely irrelevant to the Bayesian probabilistic system, which is described here, but some examples are provided below.

Metrics derived from network traffic could include data such as:
The number of bytes of data entering or leaving a networked device per time interval.

File access.

The commonality/rarity of a communications process

Invalid SSL certification.

Failed authorization attempt.

Email access patterns.

In the case where TCP, UDP or other Transport Layer IP protocols are used over the IP network, and in cases where alternative Internet Layer protocols are used (e.g. ICMP, IGMP), knowledge of the structure of the protocol in use and basic packet header analysis can be utilized to generate further metrics, such as:

The number of multicasts per time interval originating from a networked device and intended to reach publicly addressable IP ranges.

The number of internal link-local IP Broadcast requests originating from a networked device.

The size of the packet payload data.

The number of individual TCP connections made by a device, or data transferred by a device, either as a combined total across all destinations or to any definable target network range, (e.g. a single target machine, or a specific network range)

In the case of IP traffic, in the case where the Application Layer protocol can be determined and analyzed, further types of time series metric can be defined, for example:

The number of DNS requests a networked device generates per time interval, again either to any definable target network range or in total.

The number of SMTP, POP or IMAP logins or login failures a machine generates per time interval.

The number of LDAP logins or login failures a generated.

Data transferred via file sharing protocols such as SMB, SMB2, FTP, etc.

Logins to Microsoft Windows Active Directory, SSH or Local Logins to Linux or Unix Like systems, or other authenticated systems such as Kerberos.

The raw data required to obtain these metrics may be collected via a passive fiber or copper connection to the networks internal switch gear, from virtual switching implementations, from cloud based systems, or from communicating devices themselves. Ideally the system receives a copy of every communications packet to provide full coverage of an organization.

For other sources, a number of domain specific time series data are derived, each chosen to reflect a distinct and identifiable facet of the underlying source of the data, which in some way reflects the usage or behavior of that system over time.

Many of these time series data are extremely sparse, and have the vast majority of data points equal to 0. Examples would be employee's using swipe cards to access a building or part of a building, or user's logging into their workstation, authenticated by Microsoft Windows Active Directory Server, which is typically performed a small number of times per day. Other time series data are much more populated, for example the size of data moving to or from an always-on Web Server, the Web Servers CPU utilization, or the power usage of a photocopier.

Regardless of the type of data, it is extremely common for such time series data, whether originally produced as the result of explicit human behavior or an automated computer or other system to exhibit periodicity, and have the tendency for various patterns within the data to recur at approximately regular intervals. Furthermore, it is also common for such data to have many distinct but independent regular time periods apparent within the time series.

At step S3, detectors carry out analysis of the second order metrics. Detectors are discrete mathematical models that implement a specific mathematical method against different sets of variables with the target network. For example, HMM may look specifically at the size and transmission time of packets between nodes. The detectors are provided in a hierarchy that is a loosely arranged pyramid of models. Each detector model effectively acts as a filter and passes its output to another model higher up the pyramid. At the top of the pyramid is the Bayesian probabilistic that is the ultimate threat decision making model. Lower order detectors each monitor different global attributes or 'features' of the underlying network and or computers. These attributes consist of value over time for all internal computational features such as packet velocity and morphology, endpoint file system values, and TCP/IP protocol timing and events. Each detector is specialized to record and make decisions on different environmental factors based on the detectors own internal mathematical model such as an HMM.

While the threat detection system may be arranged to look for any possible threat, in practice the system may keep watch for one or more specific threats depending on the network in which the threat detection system is being used. For example, the threat detection system provides a way for known features of the network such as desired compliance and Human Resource policies to be encapsulated in explicitly defined heuristics or detectors that can trigger when in concert with set or moving thresholds of probability abnormality coming from the probability determination output. The heuristics are constructed using complex chains of weighted logical expressions manifested as regular expressions with atomic objects that are derived at run time from the output of data measuring/tokenizing detectors and local contextual information. These chains of logical expression are then stored in and/or on online libraries and parsed in real-time against output from the measures/tokenizing detectors. An example policy could take the form of "alert me if any employee subject to HR disciplinary circumstances (contextual information) is accessing sensitive information (heuristic definition) in a manner that is anomalous when compared to previous behavior (Bayesian probabilistic output)". In other words, different arrays of pyramids of detectors are provided for detecting particular types of threats.

The analysis performed by the detectors on the second order metrics then outputs data in a form suitable for use with the model of normal behavior. As will be seen, the data is in a form suitable for comparing with the model of normal behavior and for updating the model of normal behavior.

At step S4, the threat detection system computes a threat risk parameter indicative of a likelihood of there being a threat using automated adaptive periodicity detection mapped onto observed behavioral pattern-of-life analysis. This deduces that a threat over time exists from a collected set of attributes that themselves have shown deviation from normative collective or individual behavior. The automated adaptive periodicity detection uses the period of time the Bayesian probabilistic has computed to be most relevant within the observed network and/or machines. Furthermore, the pattern of life analysis identifies how a human and/or machine behaves over time, i.e. when they typically start and stop work. Since these models are continually adapting themselves automatically, they are inherently harder to defeat than known systems. The threat risk parameter is a probability of there being a threat in certain arrangements. Alternatively, the threat risk parameter is a value representative of there being a threat, which is compared against one or more thresholds indicative of the likelihood of a threat.

In practice, the step of computing the threat involves comparing current data collected in relation to the user with the model of normal behavior of the user and system being analyzed. The current data collected relates to a period in time, this could be in relation to a certain influx of new data or a specified period of time from a number of seconds to a number of days. In some arrangements, the system is arranged to predict the expected behavior of the system. The expected behavior is then compared with actual behavior in order to determine whether there is a threat.

The system uses machine learning/Artificial Intelligence to understand what is normal inside a company's network, and when something's not normal. The system then invokes automatic responses to disrupt the cyber-attack until the human team can catch up. This could include interrupting connections, preventing the sending of malicious emails, preventing file access, preventing communications outside of the organization, etc. The approach begins in as surgical and directed way as possible to interrupt the attack without affecting the normal behavior of say a laptop, but if the attack escalates, it may ultimately become necessary to quarantine a device to prevent wider harm to an organization.

In order to improve the accuracy of the system, a check can be carried out in order to compare current behavior of a user with associated users, i.e. users within a single office. For example, if there is an unexpectedly low level of activity from a user, this may not be due to unusual activity from the user, but could be due to a factor affecting the office as a whole. Various other factors can be taken into account in order to assess whether or not abnormal behavior is actually indicative of a threat.

Finally, at step S5 a determination is made, based on the threat risk parameter, as to whether further action need be taken regarding the threat. This determination may be made by a human operator after being presented with a probability of there being a threat, or an algorithm may make the determination, e.g. by comparing the determined probability with a threshold.

In one arrangement, given the unique global input of the Bayesian probabilistic, a form of threat visualization is provided in which the user can view the threat landscape across all internal traffic and do so without needing to know how their internal network is structured or populated and in such a way as a 'universal' representation is presented in a single pane no matter how large the network. A topology of the network under scrutiny is projected automatically as a graph based on device communication relationships via an interactive 3D user interface. The projection is able to scale linearly to any node scale without prior seeding or skeletal definition.

The threat detection system that has been discussed above therefore implements a propriety form of recursive Bayesian estimation to maintain a distribution over the probability state variable. This distribution is built from the complex set of low-level host, network and traffic observations or 'features'. These features are recorded iteratively and processed in real time on the platform. A plausible representation of the relational information among entities in dynamic systems in general, such as an enterprise network, a living cell or a social community, or indeed the entire Internet, is a stochastic network, which is topological rewiring and semantically evolving over time. In many high-dimensional structured I/O problems, such as the observation of packet traffic and host activity within a distributed digital enterprise, where both input and output can contain tens of thousands, sometimes even millions of interrelated features (data transport, host-web-client dialogue, log change and rule trigger, etc.), learning a sparse and consistent structured predictive function is challenged by a lack of normal distribution. To overcome this, the threat detection system consists of a data structure that decides on a rolling continuum rather than a stepwise method in which recurring time cycles such as the working day, shift patterns and other routines are dynamically assigned. Thus providing a non-frequentist architecture for inferring and testing causal links between explanatory variables, observations and feature sets. This permits an efficiently solvable convex optimization problem and yield parsimonious models. In such an arrangement, the threat detection processing may be triggered by the input of new data. Alternatively, the threat detection processing may be triggered by the absence of expected data. In some arrangements, the processing may be triggered by the presence of a particular actionable event.

The method and system are arranged to be performed by one or more processing components with any portions of software stored in an executable format on a computer readable medium. The computer readable medium may be non-transitory and does not include radio or other carrier waves. The computer readable medium could be, for example, a physical computer readable medium such as semiconductor or solid state memory, magnetic tape, a removable computer diskette, a random access memory (RAM), a read-only memory (ROM), a rigid magnetic disc, and an optical disk, such as a CD-ROM, CD-R/W or DVD.

The various methods described above may be implemented by a computer program product. The computer program product may include computer code arranged to instruct a computer to perform the functions of one or more of the various methods described above. The computer program and/or the code for performing such methods may be provided to an apparatus, such as a computer, on a computer readable medium or computer program product. For the computer program product, a transitory computer readable medium may include radio or other carrier waves.

An apparatus such as a computer may be configured in accordance with such code to perform one or more processes in accordance with the various methods discussed herein.

Web Site

The web site is configured as a browser-based tool or direct cooperating app tool for configuring, analyzing, and communicating with the cyber threat defense system.

Network

A number of electronic systems and devices can communicate with each other in a network environment. The network environment has a communications network. The network can include one or more networks selected from an optical network, a cellular network, the Internet, a Local Area Network ("LAN"), a Wide Area Network ("WAN"), a satellite network, a $3^{rd}$ party 'cloud' environment; a fiber network, a cable network, and combinations thereof. In some embodiments, the communications network is the Internet. There may be many server computing systems and many client computing systems connected to each other via the communications network.

The communications network can connect one or more server computing systems selected from at least a first server computing system and a second server computing system to each other and to at least one or more client computing systems as well. The server computing systems can each optionally include organized data structures such as databases. Each of the one or more server computing systems can have one or more virtual server computing systems, and multiple virtual server computing systems can be implemented by design. Each of the one or more server computing systems can have one or more firewalls and similar defenses to protect data integrity.

At least one or more client computing systems for example, a mobile computing device (e.g., smartphone with an Android-based operating system) can communicate with the server(s). The client computing system can include, for example, the software application or the hardware-based system in which may be able exchange communications with the first electric personal transport vehicle, and/or the second electric personal transport vehicle. Each of the one or more client computing systems can have one or more firewalls and similar defenses to protect data integrity.

A cloud provider platform may include one or more of the server computing systems. A cloud provider can install and operate application software in a cloud (e.g., the network such as the Internet) and cloud users can access the application software from one or more of the client computing systems. Generally, cloud users that have a cloud-based site in the cloud cannot solely manage a cloud infrastructure or platform where the application software runs. Thus, the server computing systems and organized data structures thereof can be shared resources, where each cloud user is given a certain amount of dedicated use of the shared resources. Each cloud user's cloud-based site can be given a virtual amount of dedicated space and bandwidth in the cloud. Cloud applications can be different from other applications in their scalability, which can be achieved by cloning tasks onto multiple virtual machines at run-time to meet changing work demand. Load balancers distribute the work over the set of virtual machines. This process is transparent to the cloud user, who sees only a single access point.

Cloud-based remote access can be coded to utilize a protocol, such as Hypertext Transfer Protocol ("HTTP"), to engage in a request and response cycle with an application on a client computing system such as a web-browser application resident on the client computing system. The cloud-based remote access can be accessed by a smartphone, a desktop computer, a tablet, or any other client computing systems, anytime and/or anywhere. The cloud-based remote access is coded to engage in 1) the request and response cycle from all web browser based applications, 3) the request and response cycle from a dedicated on-line server, 4) the request and response cycle directly between a native application resident on a client device and the cloud-based remote access to another client computing system, and 5) combinations of these.

In an embodiment, the server computing system can include a server engine, a web page management component, a content management component, and a database management component. The server engine can perform basic processing and operating-system level tasks. The web page management component can handle creation and display or routing of web pages or screens associated with receiving and providing digital content and digital advertisements. Users (e.g., cloud users) can access one or more of the server computing systems by means of a Uniform Resource Locator ("URL") associated therewith. The content management component can handle most of the functions in the embodiments described herein. The database management component can include storage and retrieval tasks with respect to the database, queries to the database, and storage of data.

In some embodiments, a server computing system can be configured to display information in a window, a web page, or the like. An application including any program modules, applications, services, processes, and other similar software executable when executed on, for example, the server computing system, can cause the server computing system to display windows and user interface screens in a portion of a display screen space. With respect to a web page, for example, a user via a browser on the client computing system can interact with the web page, and then supply input to the query/fields and/or service presented by the user interface screens. The web page can be served by a web server, for example, the server computing system, on any Hypertext Markup Language ("HTML") or Wireless Access Protocol ("WAP") enabled client computing system (e.g., the client computing system) or any equivalent thereof. The client computing system can host a browser and/or a specific application to interact with the server computing system. Each application has a code scripted to perform the functions that the software component is coded to carry out such as presenting fields to take details of desired information. Algorithms, routines, and engines within, for example, the server computing system can take the information from the presenting fields and put that information into an appropriate storage medium such as a database (e.g., database). A comparison wizard can be scripted to refer to a database and make use of such data. The applications may be hosted on, for example, the server computing system and served to the specific application or browser of, for example, the client computing system. The applications then serve windows or pages that allow entry of details.

Computing Systems

A computing system can be, wholly or partially, part of one or more of the server or client computing devices in accordance with some embodiments. Components of the computing system can include, but are not limited to, a processing unit having one or more processing cores, a system memory, and a system bus that couples various system components including the system memory to the processing unit. The system bus may be any of several types of bus structures selected from a memory bus or memory controller, a peripheral bus, and a local bus using any of a variety of bus architectures.

The computing system typically includes a variety of computing machine-readable media. Computing machine-readable media can be any available media that can be accessed by computing system and includes both volatile and nonvolatile media, and removable and non-removable media. By way of example, and not limitation, computing machine-readable media use includes storage of information, such as computer-readable instructions, data structures, other executable software or other data. Computer-storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible medium which can be used to store the desired information and which can be accessed by the computing device. Transitory media, such as wireless channels, are not included in the machine-readable media. Communication media typically embody computer readable instructions, data structures, other executable software, or other transport mechanism and includes any information delivery media.

The system memory includes computer storage media in the form of volatile and/or nonvolatile memory such as read only memory (ROM) and random access memory (RAM). A basic input/output system (BIOS) containing the basic routines that help to transfer information between elements within the computing system, such as during start-up, is typically stored in ROM. RAM typically contains data and/or software that are immediately accessible to and/or presently being operated on by the processing unit. By way of example, and not limitation, the RAM can include a portion of the operating system, application programs, other executable software, and program data.

The drives and their associated computer storage media discussed above, provide storage of computer readable instructions, data structures, other executable software and other data for the computing system.

A user may enter commands and information into the computing system through input devices such as a keyboard, touchscreen, or software or hardware input buttons, a microphone, a pointing device and/or scrolling input component, such as a mouse, trackball or touch pad. The microphone can cooperate with speech recognition software. These and other input devices are often connected to the processing unit through a user input interface that is coupled to the system bus, but can be connected by other interface and bus structures, such as a parallel port, game port, or a universal serial bus (USB). A display monitor or other type of display screen device is also connected to the system bus via an interface, such as a display interface. In addition to the monitor, computing devices may also include other peripheral output devices such as speakers, a vibrator, lights, and other output devices, which may be connected through an output peripheral interface.

The computing system can operate in a networked environment using logical connections to one or more remote computers/client devices, such as a remote computing system. The logical connections can include a personal area network ("PAN") (e.g., Bluetooth®), a local area network ("LAN") (e.g., Wi-Fi), and a wide area network ("WAN") (e.g., cellular network), but may also include other networks. Such networking environments are commonplace in offices, enterprise-wide computer networks, intranets and the Internet. A browser application or direct app corresponding with a cloud platform may be resident on the computing device and stored in the memory.

It should be noted that the present design can be carried out on a single computing system and/or on a distributed system in which different portions of the present design are carried out on different parts of the distributed computing system.

Note, an application described herein includes but is not limited to software applications, mobile apps, and programs that are part of an operating system application. Some portions of this description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms can be written in a number of different software programming languages such as Python, C, C++, or other similar languages. Also, an algorithm can be implemented with lines of code in software, configured logic gates in software, or a combination of both. In an embodiment, the logic consists of electronic circuits that follow the rules of Boolean Logic, software that contain patterns of instructions, or any combination of both.

It should be borne in mind, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices.

Many functions performed by electronic hardware components can be duplicated by software emulation. Thus, a software program written to accomplish those same functions can emulate the functionality of the hardware components in input-output circuitry. The functionality performed by one or modules may be combined into a single module, where logically possible, and a module's functionality may be split into multiple modules.

While the foregoing design and embodiments thereof have been provided in considerable detail, it is not the intention of the applicant(s) for the design and embodiments provided herein to be limiting. Additional adaptations and/or modifications are possible, and, in broader aspects, these adaptations and/or modifications are also encompassed. Accordingly, departures may be made from the foregoing design and embodiments without departing from the scope afforded by the following claims, which scope is only limited by the claims when appropriately construed.

What is claimed is:

1. A cyber security appliance comprising:
   one or more memories; and
   one or more processors operatively coupled to the one or more memories and configured to:
   utilize probes to interact with entities in a cloud infrastructure environment reliant on packet transmission, whether by application programming interface (API) interaction, accessing logging tools, observing virtualized network traffic, and/or making requests, and that use the probes to feed information about changes in the cloud infrastructure environment back to the cybersecurity appliance;
   use the information about changes in the cloud infrastructure environment fed from the probes, and use one or more machine learning models that are trained on a normal behavior of at least a first entity associated with the cloud infrastructure environment; and thus, are able to indicate when a behavior of the first entity fall outside of a normal pattern of life, where the changes in the cloud infrastructure environment incudes at least information pertaining to server access, data access, timings of events, credentials usage, and Domain Name System (DNS) requests, and where normal behavior is determined based at least in part on historical data;
   use one or more machine learning models trained on cyber threats in the cloud infrastructure environment and examine at least the behaviors of the first entity falling outside of the normal pattern of life to determine 'what is a likelihood of 'a chain of unusual behaviors under analysis that fall outside of the normal behavior' is a cyber threat; and cause one or more actions to be taken to counter the cyber threat, identified by the cyber security appliance within an organization's portion of the cloud infrastructure environment when a cyber-threat risk parameter is indicative of a likelihood of a cyber-threat is equal to or above an actionable threshold, where the one or more actions taken are caused automatically by the cyber security appliance rather than a human taking an action where the cyber security appliance further comprises a user interface to display and allow a viewer of the user interface on a display screen to contextualize Cloud and Software as a Service (SaaS) events in light of network traffic from the probes on the same user interface, where the user interface is configured to be able to pivot between SaaS metrics and Cloud metrics to link those events and better understand at least the first entity's behavior by considering the SaaS metrics and events as well as the cloud metrics and events as an interconnected whole rather than separate realms.

2. The apparatus of claim 1, where the cyber security appliance is further configured to use the information about changes in the cloud infrastructure environment from the probes and then contextualize 1) this information with ii) physical network traffic information and, when any exists, iii) behavior of the first entity outside the cloud infrastructure environment from the probes, to analyze what is the likelihood the chain of unusual behaviors under analysis that fall outside of the normal behavior is malicious activity; and thus, is the cyber threat.

3. The apparatus of claim 1, where the one or more machine learning models trained on the cloud system examine at least the behaviors of the entities of devices, containers, users, and traffic patterns falling outside of the normal pattern of life and what is the likelihood of the chain of unusual behaviors from these devices, containers, users, and traffic patterns that fall outside of the normal behavior correspond to a malicious behavior associated with the cyber threat, where the models trained on the cloud system use unsupervised machine learning and Artificial Intelligence algorithms to understand and spot the normal behavior and deviations that fall outside of the normal behavior.

4. The apparatus of claim 1, where the cyber security appliance is further configured to know when to cause the one or more autonomous actions to be taken, via a user interface setting that allows a selection of different autonomous actions to be taken to counter the cyber threat, based on a set of conditions, where the set of conditions is a setting selected from a group consisting of i) when the cyber-threat risk parameter indicative of the likelihood of the cyber-threat is equal to or above the actionable threshold and the actionable threshold is a threat level score, ii) always act when a predefined scenario with a programmable set of behaviors, unusual or not unusual, is detected which autonomously triggers the one or more actions to occur, iii) act on the chain of unusual behaviors at two or more different times when the cyber-threat risk parameter indicative of the likelihood of the cyber-threat, via another user interface setting is configured to programmably allow a set one or more different users and/or category of users of the cloud infrastructure environment to have a different threat level score needed to trigger the one or more autonomous actions to occur, or iv) any combination of these three.

5. The apparatus of claim 1, where the cyber security appliance and the one or more machine learning models trained on the cloud infrastructure environment, examine at least the behaviors of i) administrative changes in the cloud infrastructure environment, ii) traffic that in a virtual environment, and iii) virtual traffic that leaves the virtual environment in the cloud infrastructure environment and then travels over a physical network, as captured and fed back to the cyber security appliance over a secure connection by the probes.

6. The apparatus of claim 5, where the probes include
one or more of a first type of sensors configured to be installed on each cloud endpoint and programmed to send copies of network traffic to a third type of sensor, and where the first type of sensors are further configured to cooperate with the cyber security appliance to carry out the autonomous actions through the first type of sensor, and
one or more of a second type of sensors are configured to monitor the administrative changes in the cloud infrastructure environment.

7. The apparatus of claim 5, where the cyber security appliance further comprises:
one or more of a third type of sensors configured to capture a record of the virtual traffic in the virtual environment, and receive captured traffic from one or more of a first type of sensor, and
where the second type of sensors is also configured to provide the cybersecurity appliance with the IP addresses of the one or more virtual machines which are placed on a dynamic blacklist accessed by the network firewall to allow users access to the one or more virtual machines through the secure connection without needing to obtain a firewall exception to access the one or more virtual machines.

8. The apparatus of claim 1, where the cyber security appliance is further configured to take a varied list of events and metrics from the probes and then organize them into one of several distinct granular categories, in which logic in the cyber security appliance deems a most appropriate category.

9. The apparatus of claim 1, where the probes include
one or more of a second type of sensors configured to cooperate with the cyber security appliance to run a check from the cyber security appliance on and through the second type of sensors to implement a method of mapping the cloud infrastructure environment to highlight any virtual-machines which are not covered by the first type of sensor and therefore not visible to the cybersecurity appliance.

10. A method for a cyber security appliance, comprising:
configuring one or more modules to utilize probes to interact with entities in a cloud infrastructure environment that includes two or more cloud infrastructure elements reliant on packet transmission;
configuring the probes to feed information about changes in the cloud infrastructure environment back to the modules in a central location of the cyber-security appliance;
configuring a cloud module to 1) use the information about changes in the cloud infrastructure environment fed from the probes, and 2) use machine learning models that are trained on a normal behavior of the entities associated with the cloud infrastructure environment; and thus, are able to indicate when a behavior of a given entity falls outside of a normal pattern of life, where the changes in the cloud infrastructure environment incudes at least information pertaining to server access, data access, timings of events, credentials usage, and DNS requests, and where normal behavior is determined based at least in part on historical data;

configuring a cyber threat module to use one or more machine learning models trained on cyber threats in the cloud infrastructure environment and examine at least the behaviors of the first entity falling outside of the normal pattern of life to determine what is a likelihood of 'a chain of unusual behaviors under analysis that fall outside of the normal behavior' is a cyber threat;

configuring an autonomous response module, rather than a human taking an action, to cause one or more actions to counter the cyber threat within an organization's portion of the cloud infrastructure environment when a cyber-threat risk parameter is equal to or above an actionable threshold, and configuring a user interface to display and allow a viewer of the user interface on a display screen to contextualize cloud and Software as a Service (SaaS) events in light of network traffic from the probes on the same user interface, where the user interface is configured to be able to pivot between SaaS metrics and cloud metrics to link those events and better understand at least the given entity's behavior by considering the SaaS metrics and events as well as the cloud metrics and events as an interconnected whole rather than separate realms.

11. The method of claim 10, where the cyber threat module is further configured to use the information about changes in the cloud infrastructure environment from the probes and then contextualize i) this information with ii) network traffic information and, when any exists, iii) behavior of the given entity outside the cloud infrastructure environment from the probes, to analyze what is the likelihood the chain of unusual behaviors under analysis that fall outside of the normal behavior malicious activity; and thus, is the cyber threat.

12. The method of claim 10, where the one or more machine learning models trained on the cloud system examine at least the behaviors of the entities of devices, containers, users, and traffic patterns falling outside of the normal pattern of life and what is the likelihood of the chain of unusual behaviors from these devices, containers, users, and traffic patterns that fall outside of the normal behavior correspond to a malicious behavior associated with the cyber threat, where the models trained on the cloud system use unsupervised machine learning and Artificial Intelligence algorithms to understand and spot the normal behavior and deviations that fall outside of the normal behavior.

13. The method of claim 10, further comprising:
configuring the autonomous response module to know when to cause the one or more autonomous actions to be taken, via a user interface setting that allows a selection of different autonomous actions to be taken to counter the cyber threat, based on a set of conditions, where the set of conditions is a setting selected from a group consisting of i) when the cyber-threat risk parameter indicative of the likelihood of the cyber-threat is equal to or above the actionable threshold and the actionable threshold is a threat level score, ii) always act when a predefined scenario with a programmable set of behaviors, unusual or not unusual, is detected which autonomously triggers the one or more actions to occur, iii) act on the chain of unusual behaviors at two or more different times when the cyber-threat risk parameter indicative of the likelihood of the cyber-threat, via another user interface setting is configured to programmably allow a set one or more different users and/or category of users of the cloud infrastructure environment to have a different threat level score needed to trigger the one or more autonomous actions to occur, or iv) any combination of these three.

14. The method of claim 10, where the cloud module and the one or more machine learning models trained on the cloud infrastructure environment, examine at least the behaviors of i) administrative changes in the cloud infrastructure environment, ii) traffic that flows between the two or more cloud infrastructure elements reliant on packet transmission in a virtual environment, and iii) virtual traffic that leaves the virtual environment in the cloud infrastructure environment and then travels over a physical network, as captured and fed back to the modules over a secure connection by the probes.

15. The method of claim 14, further comprising:
configuring the probes to include one or more of a first type of sensors to be installed on each cloud endpoint and programmed to send copies of network traffic to one or more of the third type of sensor, and where the first type of sensors are further configured to cooperate with the autonomous response module to carry out the autonomous actions through the first type of sensor, and
configuring the probes to include one or more of a second type of sensors to monitor the administrative changes in the cloud infrastructure environment.

16. The method of claim 14, where the probes include one or more of a third type of sensors configured to capture a record of the virtual traffic that flows between the two or more cloud infrastructure elements reliant on packet transmission in the virtual environment as well as virtual traffic that leaves the virtual environment and travels over the physical network, and
where the second type of sensors is also configured to provide the cybersecurity appliance with the IP addresses of the one or more virtual machines which are placed on a dynamic blacklist accessed by the network firewall to allow users access to the one or more virtual machines through a secure connection without needing to obtain a firewall exception to access the one or more virtual machines.

17. The method of claim 10, where the cloud module is further configured to take a varied list of events and metrics from the probes and then organize them into one of several distinct granular categories, in which logic in the cloud module deems a most appropriate category.

18. The method of claim 10, where the probes include one or more of a second type of sensors configured to cooperate with the cloud module to run a check from the cyber security appliance on and through the second type of sensors to implement a method of mapping the cloud infrastructure environment to highlight any virtual-machines which are not covered by the first type of sensor and therefore not monitored by the cybersecurity appliance.

\* \* \* \* \*